US009393813B2

(12) United States Patent
Sengoku

(10) Patent No.: US 9,393,813 B2
(45) Date of Patent: Jul. 19, 2016

(54) IMAGE FORMING APPARATUS

(71) Applicant: Kenji Sengoku, Kanagawa (JP)

(72) Inventor: Kenji Sengoku, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 147 days.

(21) Appl. No.: 14/279,525

(22) Filed: May 16, 2014

(65) Prior Publication Data

US 2014/0353126 A1 Dec. 4, 2014

(30) Foreign Application Priority Data

May 30, 2013 (JP) ................................ 2013-113827
Mar. 4, 2014 (JP) ................................ 2014-041978

(51) Int. Cl.
*B65G 39/16* (2006.01)
*B41J 11/00* (2006.01)

(52) U.S. Cl.
CPC .................................... *B41J 11/007* (2013.01)

(58) Field of Classification Search
USPC ............ 198/806, 807, 810.01, 810.03, 860.3, 198/339
See application file for complete search history.

(56) References Cited

U.S. PATENT DOCUMENTS

| | | | | |
|---|---|---|---|---|
| 7,823,720 | B2 * | 11/2010 | Tabata | B41J 11/007 198/806 |
| 7,921,987 | B2 * | 4/2011 | Kitamura | B41J 11/007 198/806 |
| 2009/0180805 | A1 | 7/2009 | Nakura et al. | |
| 2010/0142985 | A1 | 6/2010 | Minbe et al. | |
| 2010/0221029 | A1 | 9/2010 | Minbu et al. | |
| 2011/0064487 | A1 | 3/2011 | Ichihashi et al. | |
| 2011/0158690 | A1 | 6/2011 | Mimbu et al. | |
| 2011/0206399 | A1 | 8/2011 | Fujita et al. | |
| 2011/0286759 | A1 | 11/2011 | Ichihashi et al. | |
| 2011/0293312 | A1 | 12/2011 | Mimbu et al. | |
| 2012/0224879 | A1 | 9/2012 | Fujita et al. | |
| 2012/0237260 | A1 | 9/2012 | Sengoku et al. | |
| 2012/0237271 | A1 | 9/2012 | Sengoku et al. | |
| 2012/0308250 | A1 | 12/2012 | Shimizu et al. | |
| 2012/0315058 | A1 | 12/2012 | Shimizu et al. | |
| 2012/0328315 | A1 | 12/2012 | Takeuchi et al. | |
| 2012/0328320 | A1 | 12/2012 | Fujita et al. | |
| 2012/0328321 | A1 | 12/2012 | Takeuchi et al. | |
| 2013/0004190 | A1 | 1/2013 | Sengoku et al. | |
| 2013/0011155 | A1 | 1/2013 | Ogiyama et al. | |
| 2013/0016989 | A1 | 1/2013 | Fujita et al. | |
| 2013/0089363 | A1 | 4/2013 | Mimbu et al. | |
| 2013/0094870 | A1 | 4/2013 | Shimizu et al. | |

(Continued)

FOREIGN PATENT DOCUMENTS

JP 2009-145765 7/2009

*Primary Examiner* — Gene Crawford
*Assistant Examiner* — Lester Rushin
(74) *Attorney, Agent, or Firm* — Oblon, McClelland, Maier & Neustadt, L.L.P

(57) ABSTRACT

An image forming apparatus includes a housing and a belt assembly. The belt assembly includes a plurality of rollers, a belt, a belt first support, and a belt second support. The belt assembly is detachably attachable relative to the housing. The plurality of rollers includes a rotary shaft. The belt is entrained around the plurality of rollers and rotated in a certain direction. The belt first support supports the rotary shaft of the plurality of rollers at a first end in a width direction thereof and is movable in a direction of twist and fixedly supported by the housing. The belt second support is fixedly supported by the housing and supports the rotary shaft of the plurality of rollers at a second end opposite the first end in the width direction.

23 Claims, 12 Drawing Sheets

(56) References Cited

U.S. PATENT DOCUMENTS

2013/0136477 A1 5/2013 Ogiyama et al.
2013/0189002 A1 7/2013 Ichihashi et al.
2013/0223901 A1 8/2013 Minbe et al.
2013/0322935 A1 12/2013 Ichihashi et al.
2014/0072340 A1 3/2014 Kato et al.

* cited by examiner

IMAGE FORMING APPARATUS

CROSS-REFERENCE TO RELATED APPLICATIONS

This patent application is based on and claims priority pursuant to 35 U.S.C. §119 from Japanese Patent Application Nos. 2013-113827, filed on May 30, 2013, and 2014-041978, filed on Mar. 4, 2014, both in the Japan Patent Office, which are hereby incorporated herein by reference in their entirety.

BACKGROUND

1. Technical Field

Exemplary aspects of the present invention generally relate to an image forming apparatus, such as a copier, a facsimile machine, a printer, or a digital multi-functional system including a combination thereof, and more particularly, to an image forming apparatus equipped with a detachably-attachable belt assembly including a belt such as an intermediate transfer belt, conveyor belt, and a photosensitive belt.

2. Description of the Related Art

There has been known an image forming apparatus such as a copier and a printer equipped with a belt assembly. In the known image forming apparatus, four image bearing members, i.e., photosensitive drums are arranged in tandem facing a belt member, i.e., an intermediate transfer belt. Toner images of the colors black, yellow, magenta, and cyan are formed on the respective photosensitive drums. Then, the toner images of each color are primarily and overlappingly transferred onto the intermediate transfer belt, thereby forming a composite toner image. This process is known as a primary transfer process. The composite toner image on the intermediate transfer belt is secondarily transferred as a color toner image onto a recording medium in a secondary transfer process.

In such an image forming apparatus, belt skew of the intermediate transfer belt (for example, displacement of the intermediate transfer belt in its width direction thereof) is corrected by detecting the position (displacement) of the end of the intermediate transfer belt in the width direction.

More specifically, in the known image forming apparatus a detector detects the displacement of the belt member, i.e., the intermediate transfer belt, in the width direction. Based on the detection result, the displacement or belt skew of the intermediate transfer belt is corrected by a correction roller. In this configuration, a connecting member (swingable arm) connected to one end portion of the correction roller around which the intermediate transfer belt is entrained is swingably moved by an eccentric cam, and the other end of the correction roller is fixed so as to change an inclination of the correction roller to correct the displacement of the intermediate transfer belt.

Furthermore, an adjuster for adjusting the fixed end portion of the correction roller is provided to correct more reliably the belt skew of the intermediate transfer belt in the event in which a frame of the belt assembly is deformed or straightness of the rollers around which the intermediate transfer belt is entrained is not sufficient.

Even when the default position of the correction roller shifts off from the center position of the range of movement thereof due to distortion of the frame of the belt assembly and/or insufficient straightness of the rollers around which the intermediate transfer belt is entrained, the adjuster can move the default position of the correction roller towards the center of the range of movement by moving the adjust manually, hence correcting the belt skew.

Although advantageous, in a case in which the belt assembly including the intermediate transfer belt is detachably attachable relative to the main body of the image forming apparatus, the belt assembly may not be installed in the main body of the image forming apparatus with accuracy due to errors in the dimensional accuracy and assemblage accuracy of various parts constituting a support for supporting the belt assembly in the main body of the image forming apparatus, causing a failure in correction of the belt skew by the correction roller and deviation of belt tension of the intermediate transfer belt.

The difficulty described above is not limited to an image forming apparatus using the intermediate transfer belt. The similar difficulty arises in image forming apparatuses using a belt assembly equipped with a belt member such as a transfer conveyor belt and a photosensitive belt.

In view of the above, there is thus an unsolved need for an image forming apparatus capable of reliable installation of the belt assembly without misalignment of the belt assembly, hence preventing a deviation of the belt tension.

SUMMARY

In view of the foregoing, in an aspect of this disclosure, there is provided an improved image forming apparatus including a housing and a belt assembly. The belt assembly includes a plurality of rollers, a belt, a belt first support, and a belt second support. The belt assembly is detachably attachable relative to the housing. The plurality of rollers includes a rotary shaft. The belt is entrained around the plurality of rollers and rotated in a certain direction. The belt first support supports the rotary shaft of the plurality of rollers at a first end in a width direction thereof and is movable in a direction of twist and fixedly supported by the housing. The belt second support is fixedly supported by the housing and supports the rotary shaft of the plurality of rollers at a second end opposite the first end in the width direction.

According to another aspect, an image forming apparatus includes a housing, a belt assembly, and an adjuster. The belt assembly is detachably attachable relative to the housing and includes a plurality of rollers, each of which includes a rotary shaft; a belt entrained around the plurality of rollers and rotated in a certain direction; a belt first support to support a first end of the plurality of rollers, the belt first support including a pair of first positioning members; a belt second support to support a second end of the plurality of rollers opposite the first end, the belt second support including a pair of second positioning members. The housing includes a main-body first support to fixedly support the pair of first positioning members and a main-body second support to fixedly support the pair of second positioning members. Where R is an imaginary plane passing through fixed positions of three positioning members among the pair of first positing members and the pair of second positioning members, a fixed position of a remaining one of the first positioning members and the second positioning members is adjusted by the adjuster towards and away from the imaginary plane R.

According to still another aspect, an image forming apparatus includes a housing and a belt assembly. The belt assembly includes a plurality of rollers, a belt, a pair of first positioning pins, and an adjuster. The plurality of rollers includes a rotary shaft. The belt is entrained around the plurality of rollers and rotated in a certain direction. The pair of first positioning pins including a first pin and a second pin, to position the belt assembly in place relative to the housing at a first end in a width direction of the belt. The adjuster adjusts a position of the second pin relative to the first pin.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION

Figure 1:
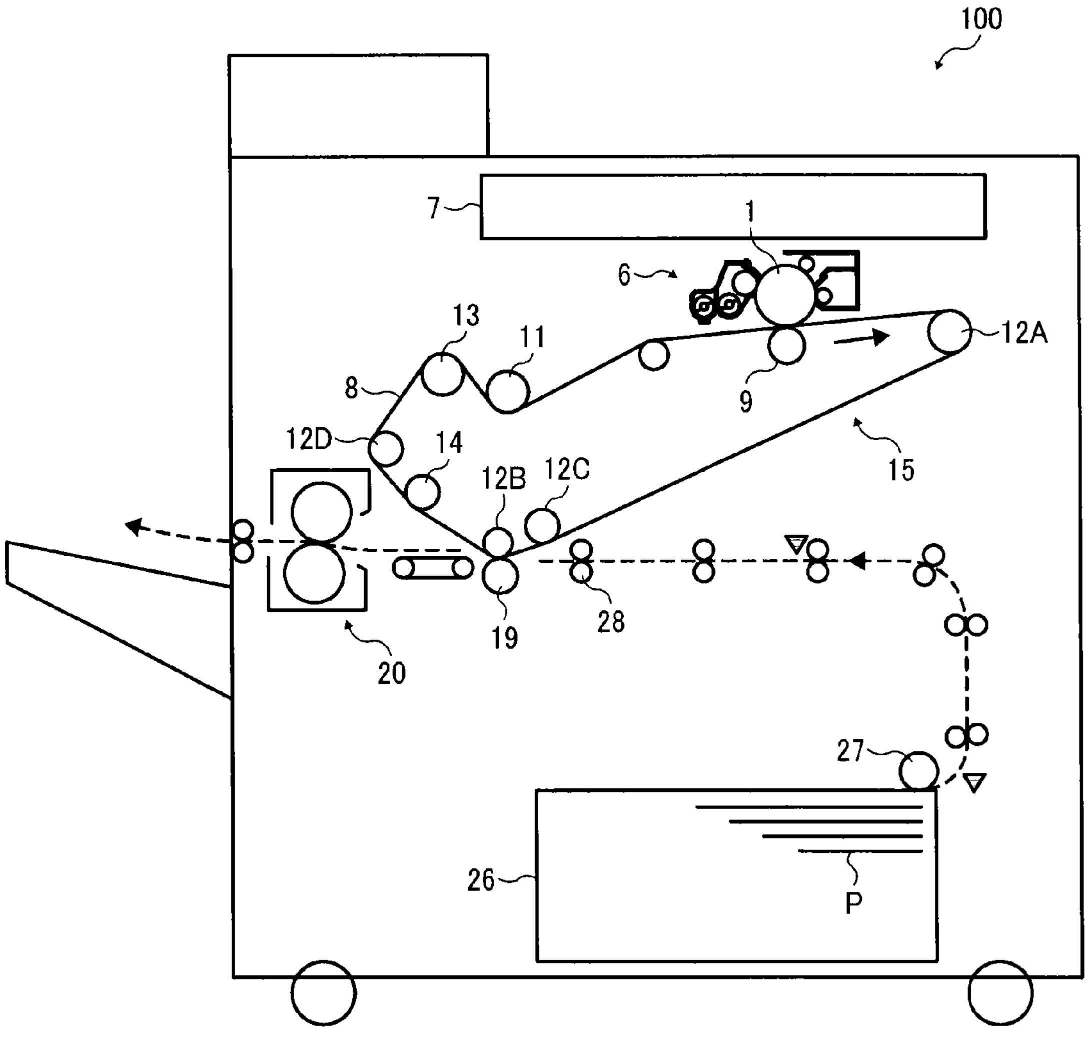
FIG. 1 is a schematic diagram illustrating a printer as an illustrative embodiment of the present disclosure.

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, exemplary embodiments of the present patent application are described.

Figure 2:
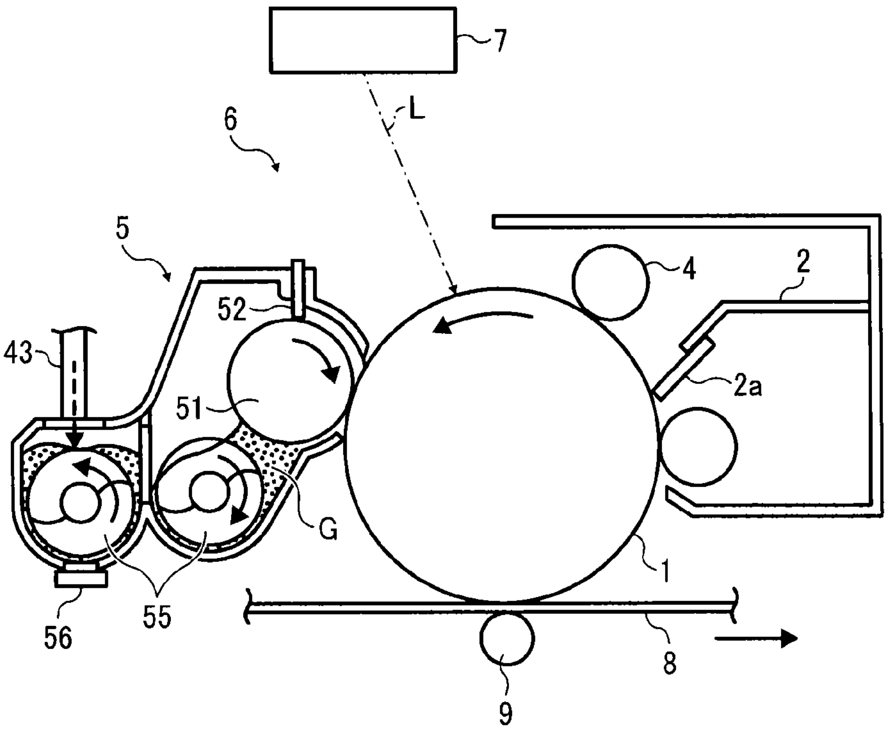
FIG. 2 is a cross-sectional diagram schematically illustrating an image forming unit (process cartridge) employed in the image forming apparatus of FIG. 1.

With reference to FIGS. 1 and 2, a description is provided of configuration and operation of an image forming apparatus, according to an illustrative embodiment of the present disclosure.

FIG. 1 is a schematic diagram illustrating a printer as an example of the image forming apparatus according to an illustrative embodiment of the present disclosure. FIG. 2 is a cross-sectional diagram schematically illustrating an image forming unit (process cartridge) employed in the image forming apparatus of FIG. 1.

As illustrated in FIG. 1, an image forming apparatus includes a main body (housing) 100, an image forming unit (process cartridge) 6, and a belt assembly, that is, an intermediate transfer belt assembly 15 equipped with a belt, that is, an intermediate transfer belt 8. The intermediate transfer belt assembly 15 is disposed substantially in the center of the main body 100. The image forming unit (process cartridge) 6 corresponding to the color black is detachably disposed facing the intermediate transfer belt 8 of the intermediate transfer belt assembly 15. The image forming unit 6 is replaceable.

As will be described later in detail, according to the present illustrative embodiment, the intermediate transfer belt assembly 15 is detachably attachable relative to the main body 100 of the image forming apparatus.

With reference to FIG. 2, a description is provided of the image forming unit (process cartridge) 6. The image forming unit 6 includes a photosensitive drum 1 serving as an image bearing member, around which a charging device 4, a development device 5, a cleaning device 2, a charge eraser, and so forth are disposed. Image forming processes including charging, exposure, development, transfer, and cleaning are performed on the photosensitive drum 1, thereby forming a toner image on the photosensitive drum 1.

As illustrated in FIG. 2, the photosensitive drum 1 rotates in a counterclockwise direction by a drive motor. When the surface of the photosensitive drum 1 arrives at the charging device 4, the photosensitive drum 1 is uniformly charged by the charging device 4. This process is known as a charging process. According to the illustrative embodiment, a charging roller that contacts the photosensitive drum 1 is used as the charging device 4. Alternatively, the charging device 4 may be constituted of a contact-free charging roller disposed opposite the photosensitive drum 1 with a predetermined gap therebetween.

After the surface of the photosensitive drum 1 is uniformly charged, the exposure device 7 illuminates the surface thereof with a laser light L, thereby forming an electrostatic latent image thereon. This process is known as exposure.

As the surface of the photosensitive drum 1 comes to the development device 5, the electrostatic latent image is developed with toner, thereby forming a toner image. This process is known as development.

As the toner image on the photosensitive drum 1 arrives at a position opposite a primary transfer roller 9 via the intermediate transfer belt 8 after the development as described above, the toner image is primarily transferred onto the intermediate transfer belt 8. This process is a so-called primary transfer process. After the primary transfer process, a small amount of toner (residual toner), which has not been transferred onto the intermediate transfer belt 8, remains on the photosensitive drum 1.

As the photosensitive drum 1 rotates, a cleaning blade 2*a* of the cleaning device 2 collects the residual toner on the surface of the photosensitive drum 1 in a cleaning process.

Lastly, the photosensitive drum 1 comes to the charge eraser. The charge eraser removes residual potential from the surface of the photosensitive drum 1 in preparation for the subsequent imaging cycle, thereby completing a sequence of the image forming processes on the photosensitive drum 1.

Figure 3:
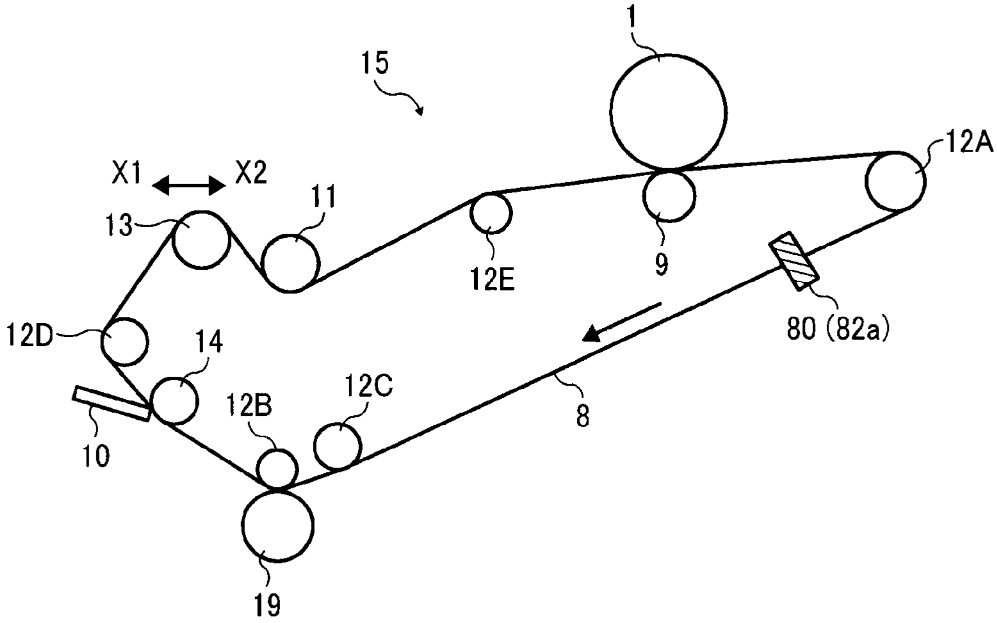
FIG. 3 is a schematic diagram illustrating a belt assembly employed in the image forming apparatus of FIG. 1.

With reference to FIG. 3, a description is provided of the belt assembly, that is, the intermediate transfer belt assembly 15. As illustrated in FIG. 3, the intermediate transfer belt assembly 15 includes a belt member, i.e., the intermediate transfer belt 8, the primary transfer roller 9, a drive roller 12A, a secondary-transfer opposing roller 12B (i.e., repulsive force roller), three tension rollers 12C through 12E, a correction roller 13 (i.e., steering control roller), an outer tension roller 11, a cleaning opposing roller 14, a detector 80, a belt cleaning device 10, and so forth. The intermediate transfer belt 8 is entrained around and stretched taut between the plurality of rollers: the primary transfer roller 9, the drive roller 12A, the secondary-transfer opposing roller 12B, three tension rollers 12C through 12E, the correction roller 13, and the cleaning opposing roller 14. The intermediate transfer belt 8 is rotated by one roller, here, the drive roller 12A in the direction indicated by an arrow in FIG. 3.

The intermediate transfer belt 8 is interposed between the primary transfer roller 9 serving as a primary transfer device and the photosensitive drum 1, thereby forming a primary transfer nip. A transfer bias consisting of a transfer voltage having a polarity opposite that of the toner is applied to the primary transfer roller 9.

While the intermediate transfer belt 8 moves in the direction of arrow, the toner image formed on the photosensitive drum 1 is primarily transferred onto the intermediate transfer belt 8 at the primary transfer nip of the primary transfer roller 9.

Subsequently, the intermediate transfer belt 8 bearing the primarily transferred toner image arrives at a position opposite a secondary transfer roller 19 serving as a secondary transfer device. The intermediate transfer belt 8 is interposed between the secondary-transfer opposing roller 12B and the secondary transfer roller 19, thereby forming a secondary transfer nip. Subsequently, the toner image formed on the surface of the intermediate transfer belt 8 is secondarily transferred onto a recording medium P delivered to the secondary transfer nip. Some toner (residual toner) having not been transferred onto the recording medium P remains on the intermediate transfer belt 8.

Subsequently, the intermediate transfer belt 8 arrives at the belt cleaning device 10 which removes the residual toner from the intermediate transfer belt 8 thereby completing a sequence of the transfer process.

A detailed description of a configuration and operation of the intermediate transfer belt assembly 15 as a belt assembly is provided later with reference to FIGS. 3 through 10.

Referring back to FIG. 1, the recording medium P is supplied from a sheet feeding unit 26 disposed substantially at a lower portion of the main body 100 of the image forming apparatus and delivered to secondary transfer nip via a sheet feed roller 27, a pair of registration rollers 28, and so forth.

In the sheet feeding unit 26, a plurality of transfer sheets such as recording media sheets P is stacked. As the sheet feed roller 27 is rotated in the counterclockwise direction in FIG. 1, the sheet feed roller 27 picks up a top sheet from the stack of recording media P in the sheet feeding unit 26 and feeds it to the pair of registration rollers 28.

The recording medium P is temporarily stopped at the pair of registration rollers 28, rotation of which is stopped. Rotation of the pair of registration rollers 28 resumes in appropriate timing such that the recording medium P is sent to the secondary transfer nip and is aligned with the toner image formed on the intermediate transfer belt 8. Accordingly, the toner image is transferred onto the recording medium P.

The recording medium P on which the toner image is transferred at the secondary transfer nip is conveyed to a fixing device 20. Subsequently, the toner image transferred onto the recording medium P is fixed on the recording medium P with heat and pressure applied thereto, thereby forming an image on the recording medium P.

The recording medium P, on which the image is fixed, is discharged outside the image forming apparatus through a pair of sheet discharge rollers, onto a sheet stack portion, thereby completing a sequence of image forming processes in the image forming apparatus.

Next, with reference to FIG. 2, a more detailed description is provided of the development device 5 in the image forming unit 6.

The development device 5 includes a development roller 51 facing the photosensitive drum 1, a doctor blade 52 facing the development roller 51, two conveyor screws 55, a toner supply passage 43, a density detector 56, and so forth. The conveyor screws 55 are each disposed inside two developing agent chambers. The toner supply passage 43 is connected to an opening of the developing agent chamber. The density detector 56 detects a density of toner in a developing agent G. The development roller 51 includes a magnet fixed inside thereto, a sleeve that rotates around the magnet, and so forth. The developing agent G is a two-component developing agent consisting of carrier and toner, and is stored inside the developing agent chambers.

The sleeve of the development roller 51 rotates in the direction of arrow in FIG. 2. The developing agent G borne on the development roller 51 due to the magnetic field formed by the magnet travels on the development roller 51 as the sleeve rotates. At this time, a ratio of toner in the developing agent G (density of toner) in the development device 5 is adjusted to fall within a predetermined range.

Subsequently, the toner supplied to the developing agent chamber is mixed with the developing agent by the conveyor screws 55, and circulates (moves in the vertical direction relative to the surface of FIG. 2) in the developing agent chambers which are separated. Toner particles in the developing agent G stick to carrier particles due to frictional charging with the carrier particles. Then, the toner particles sticking to the carrier particles are borne on the development roller 51.

The developing agent G borne on the development roller 51 is delivered the doctor blade 52 in the direction of arrow in FIG. 2. Subsequently, after an amount of the developing agent G on the development roller 51 is optimized, the developing agent G is delivered to a development area opposite the photosensitive drum 1. An electric field formed in the development area causes the toner to stick to a latent image formed on the photosensitive drum 1. Subsequently, the developing agent remaining on the development roller 51 reaches the upper portion of the developing agent chamber as the sleeve rotates, and then separates from the development roller 51.

Next, with reference to FIGS. 3 through 10, a description is provided of the belt assembly, that is, the intermediate transfer belt assembly 15 according to an illustrative embodiment of the present disclosure.

Figure 4A:
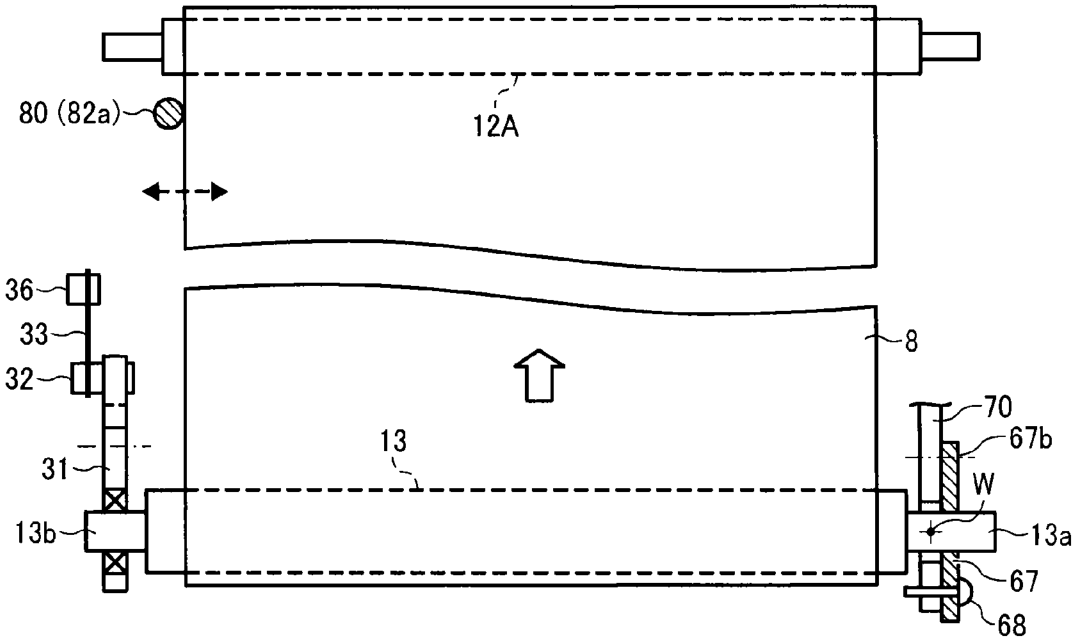
FIG. 4A is a top view schematically illustrating the belt assembly as viewed in a width direction thereof.
Figure 4B:
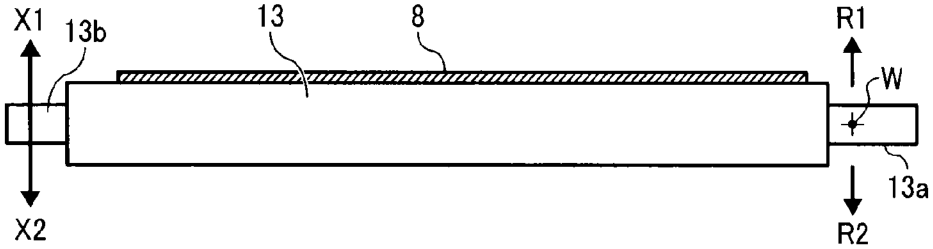
FIG. 4B is a lateral view schematically illustrating the belt assembly as viewed in the width direction thereof.
Figure 5:
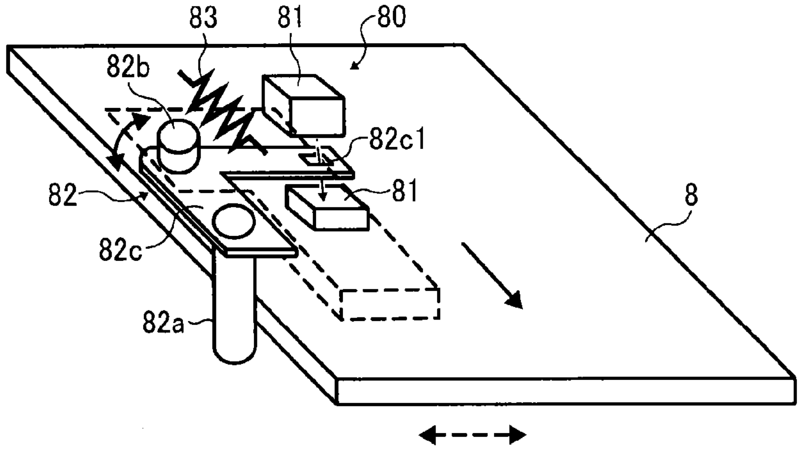
FIG. 5 is a perspective view schematically illustrating a detector and a structure around the detector according to an illustrative embodiment of the present disclosure.
Figure 6:
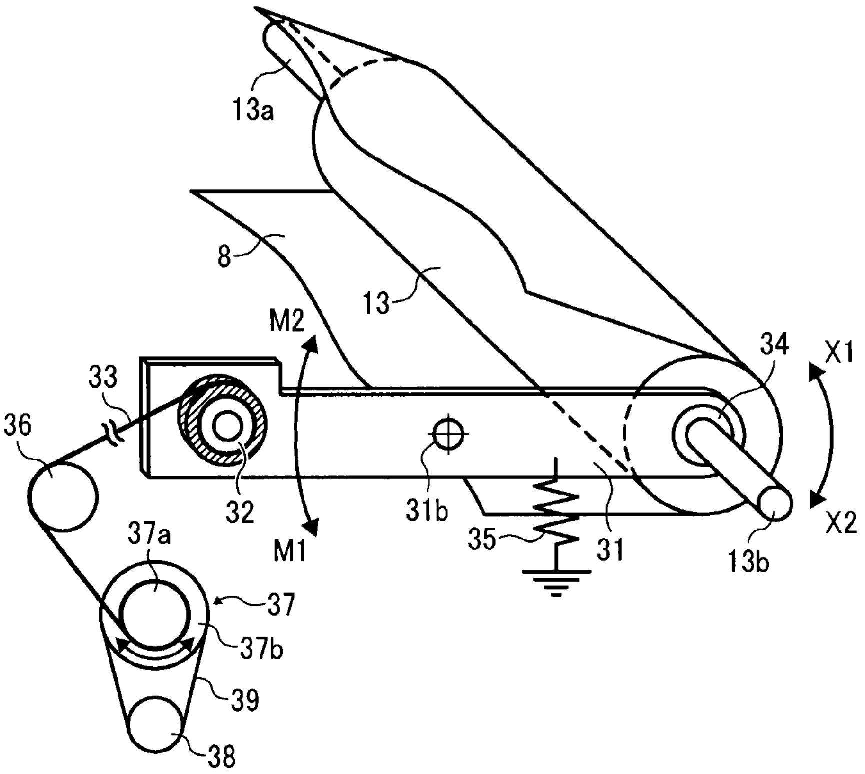
FIG. 6 is a perspective view schematically illustrating a correction roller as viewed from a distal end (rear side) according to an illustrative embodiment of the present disclosure.
Figure 7:
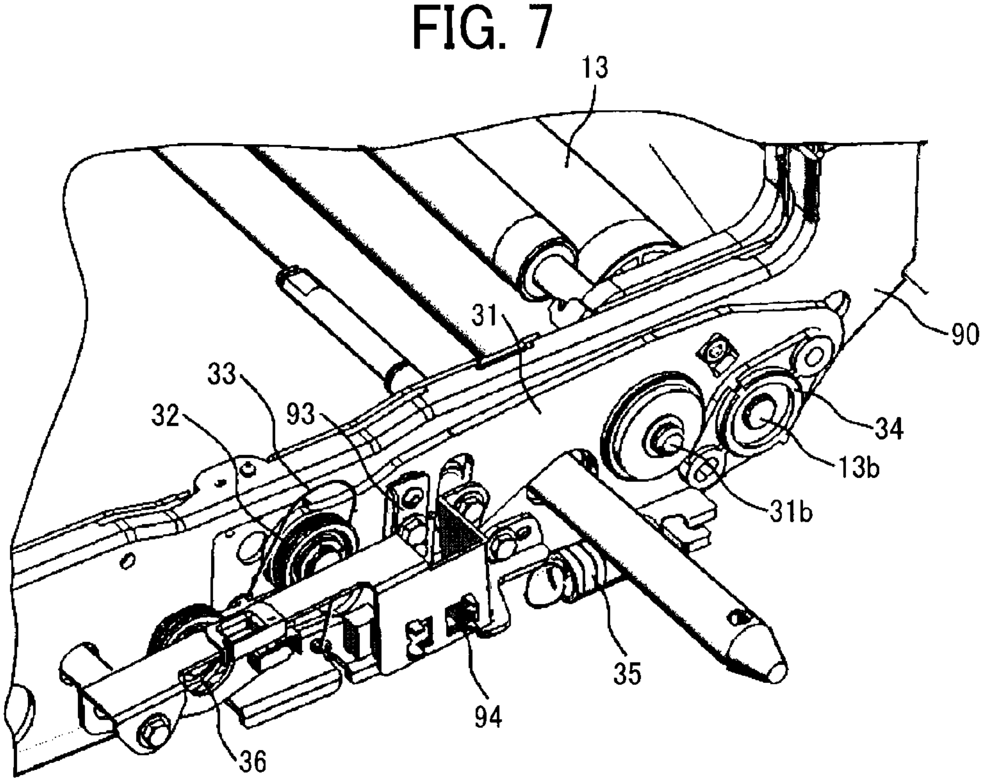
FIG. 7 is a partially enlarged perspective view schematically illustrating the correction roller as viewed from the distal end (rear side)
Figure 8:
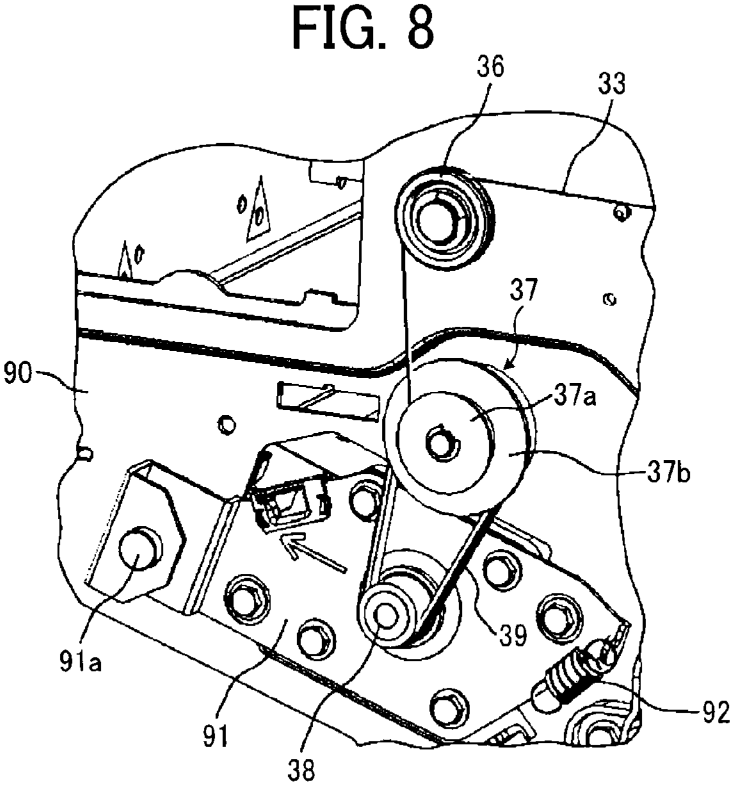
FIG. 8 is a partially enlarged perspective view schematically illustrating a drive pulley according to an illustrative embodiment of the present disclosure.
Figure 9:
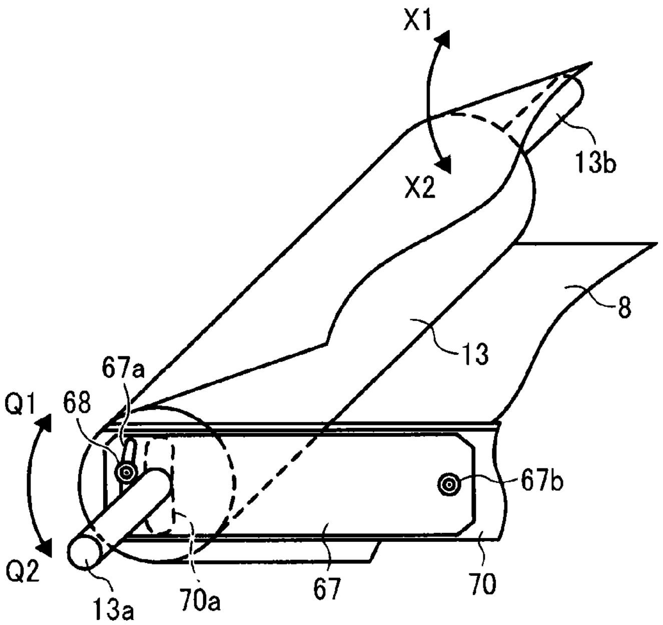
FIG. 9 is a perspective view schematically illustrating the correction roller as viewed from a proximal end which is opposite the distal end.
Figure 10:
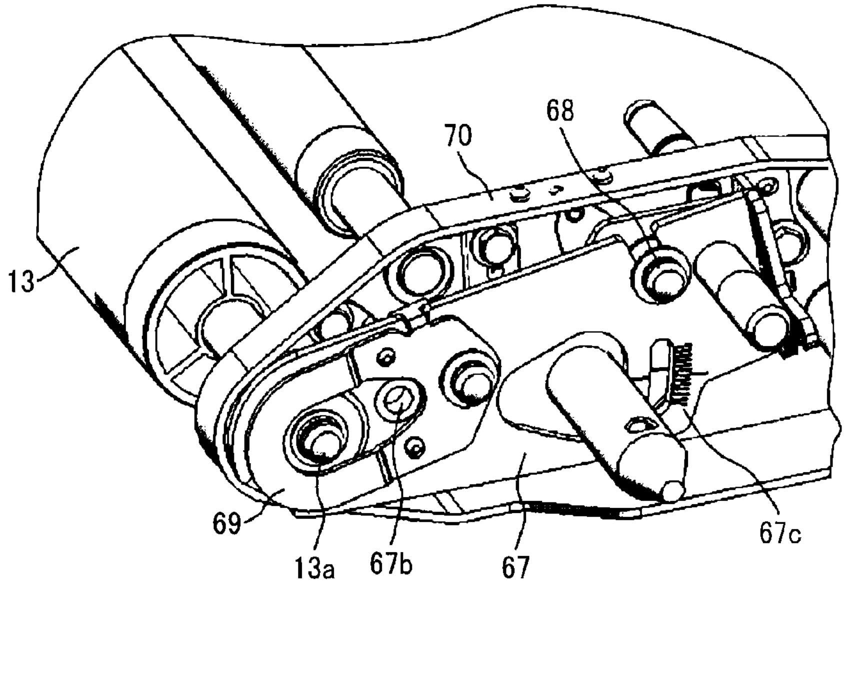
FIG. 10 is a perspective view schematically illustrating an adjuster according to another illustrative embodiment of the present disclosure.

FIG. 3 is a schematic diagram illustrating the intermediate transfer belt assembly 15 as an example of a belt assembly employed in the image forming apparatus. FIG. 4A is a top view schematically illustrating the intermediate transfer belt assembly 15 as viewed in a width direction thereof. FIG. 4B is a lateral view schematically illustrating the intermediate transfer belt assembly 15 as viewed in the width direction thereof according to an illustrative embodiment of the present disclosure. FIG. 5 is a perspective view schematically illustrating a detector 80 and the structure around the detector 80 employed in the intermediate transfer belt assembly 15. FIG. 6 is a perspective view schematically illustrating the correction roller 13 and the structure around the correction roller 13 as viewed from a distal end (rear side), shown in a partially simplified manner. FIG. 7 is a partially enlarged perspective view schematically illustrating the correction roller 13 as viewed from the distal end. FIG. 8 is a partially enlarged perspective view schematically illustrating a drive pulley 38 as a drive source for moving a swingable arm 31 according to an illustrative embodiment of the present disclosure. FIG. 9 is a perspective view schematically illustrating an adjustment mechanism near the correction roller 13 as viewed from a proximal end which is opposite the distal end. FIG. 10 is a perspective view schematically illustrating another example of an adjustment mechanism near the correction roller 13 as viewed from the proximal end.

As illustrated in FIGS. 3 and 4, the intermediate transfer belt assembly 15 (belt assembly) includes the intermediate transfer belt 8 as a belt member, the primary transfer roller 9, the drive roller 12A, the secondary-transfer opposing roller 12B (repulsive force roller), three tension rollers 12C through 12E, the correction roller 13 as a correction device (steering control roller), the outer tension roller 11, the cleaning opposing roller 14, the detector 80, the belt cleaning device 10, and so forth.

The intermediate transfer belt 8 is disposed facing the photosensitive drum 1 which serves as an image bearing member for bearing a toner image of the color black. The intermediate transfer belt 8 is entrained around and supported mainly by nine rollers (i.e., the primary transfer roller 9, the drive roller 12A, the secondary-transfer opposing roller 12B, the tension rollers 12C through 12E, the outer tension roller 11, the correction roller 13, and the cleaning opposing roller 14).

According to the present illustrative embodiment, the intermediate transfer belt 8 includes a single layer or multiple layers including, but not limited to, polyimide (PI), polyvinylidene fluoride (PVDF), ethylene tetrafluoroethylene (ETFE), and polycarbonate (PC), with conductive material such as carbon black dispersed therein. The volume resistivity of the intermediate transfer belt 8 is in a range of from approximately $10^7$ Ω cm to $10^{12}$ Ω cm. The surface resistivity thereof is in a range of from approximately $10^8$ Ω cm to $10^{12}$ Ω cm. The thickness of the intermediate transfer belt 8 is in a range of from 80 μm to 100 μm. According to the present illustrative embodiment, the thickness thereof is set to be approximately 90 μm.

It is to be noted that the surface of the intermediate transfer belt 8 may be coated with a release layer, as necessary. The release layer may include, but is not limited to, fluorocarbon resin such as ethylene tetrafluoroethylene (ETFE), polytetrafluoroethylene (PTFE), polytetrafluoroethylene (PVDF), perfluoroalkoxy polymer resin (PFA), fluorinated ethylene propylene (FEP), and polyvinyl fluoride (PVF).

The intermediate transfer belt 8 is manufactured through a casting process, a centrifugal casting process, and the like. The surface of the intermediate transfer belt 8 may be ground as necessary.

The primary transfer roller 9 is disposed opposite the photosensitive drum 1, with the intermediate transfer belt 8 interposed therebetween.

The outer tension roller 11 is biased against the outer circumferential surface of the intermediate transfer belt 8 at a downstream side near the correction roller 13 by a biasing member, thereby pressingly contacting the intermediate transfer belt 8 with a predetermined pressure and maintaining appropriate tension in the intermediate transfer belt 8.

The drive roller 12A is rotatably driven by a drive motor, thereby moving the intermediate transfer belt 8 in a predetermined direction (i.e., in the clockwise direction in FIG. 3).

The secondary-transfer opposing roller 12B contacts the secondary transfer roller (secondary transfer member) 19 via the intermediate transfer belt 8. Three tension rollers 12C through 12E contact the inner circumferential surface of the intermediate transfer belt 8. The belt cleaning device 10, i.e., a cleaning blade, is disposed facing the cleaning opposing roller 14 between the secondary-transfer opposing roller 12B and the tension roller 12D.

According to the present illustrative embodiment, the intermediate transfer belt assembly 15 includes the detector 80 that detects displacement of the intermediate transfer belt 8 in the width direction thereof (i.e., the direction perpendicular to the drawing sheet in FIG. 3). In other words, the detector 80 is disposed at a position corresponding to the end portion of the intermediate transfer belt 8 in the width direction thereof.

More specifically, as illustrated in FIG. 5, the detector 80 includes a swingable member 82, an optical detector 81, a spring 83 as a biasing member, and so forth. The swingable member 82 includes a contact member 82*a* that contacts an end portion of the intermediate transfer belt 8 in the width direction. The optical detector 81 is a photodetector that detects a degree of displacement of the swingable member 82. The spring 83 biases the swingable member 82 (contact member 82*a*) towards the intermediate transfer belt 8.

The swingable member 82 includes the contact member 82*a*, a rotary support shaft 82*b*, an arm 82*c*, and so forth. The contact member 82*a* has a substantially cylindrical shape, the center of which contacts the end portion of the intermediate transfer belt 8 in the width direction. A base portion of the contact member 82*a* is fixed to one end of the arm 82*c*. The rotary support shaft 82*b* is rotatably supported by a housing of the intermediate transfer belt assembly 15. The arm 82*c* is substantially L-shaped, and the rotary support shaft 82*b* is formed in the center of the arm 82*c*. The other end of the arm 82*c* includes an opening 82*c*1. One end of the spring 83 is connected to the arm 82*c* between the opening 82*c*1 and the rotary support shaft 82*b*. The other end of the spring 83 is connected to a second frame (housing) 90 of the intermediate transfer belt assembly 15.

With this configuration, the swingable member 82 swingably follows the displacement, i.e., belt skew, of the intermediate transfer belt 8 in the width direction (directions of a broken-line two-way arrow in FIG. 5).

The optical detector 81 is disposed (fixed to the housing) such that the opening 82*c*1 of the arm 82*c* of the swingable member 82 is interposed between the optical detector 81. More specifically, the optical detector 81 includes a light emitting element and a light receiving element 81*b*. The light emitting element is disposed above the arm 82*c* (opening 82*c*1) with a certain gap therebetween. The light receiving element is disposed below the arm 82*c* (opening 82*c*1) with a certain gap therebetween. The light emitted from the light emitting element strikes the light receiving element 81*b* via the opening 82*c*1. At this time, the arm 82*c* rotates about the rotary support shaft 82*b*, thereby changing the position of the opening 82*c*1 opposite the optical detector 81 and hence changing the amount of light striking the light receiving element. Accordingly, an output value of the light receiving element 81*b* of the optical detector 81 changes proportionally. With this configuration, the degree of displacement (position of the end portion) of the intermediate transfer belt 8 in the width direction thereof can be detected.

When the displacement (degree of displacement) of the intermediate transfer belt 8 is detected by the detector 80, the displacement in the width direction of the intermediate transfer belt 8 is corrected by the correction roller 13 (correction devices 31 through 39) based on the detection result. In a case in which belt skew is not corrected within a predetermined time period, that is, in a case in which the detection result provided by the detector 80 does not change within a predetermined range, it is determined that correction of the belt skew has failed, and the operation of the image forming apparatus is stopped.

As illustrated in FIG. 3, the correction roller 13 is disposed upstream from the photosensitive drum 1 in the traveling direction of the intermediate transfer belt 8 and contacts the inner circumferential surface of the intermediate transfer belt 8. As illustrated in FIGS. 4A and 4B, and 6, a swingable arm 31 swingably moves due to winding and unwinding of a wire 33, thereby enabling the correction roller 13 to swingably move about a swing center W (fixedly supported by a first frame 70 at the belt assembly side via an adjuster 67) in directions of X1 and X2 (up and down directions).

With this configuration, in FIG. 4A, when the intermediate transfer belt 8 drifts to the right (belt skew towards the right), the correction roller 13 is swingably moved in the direction X1, thereby correcting displacement of the intermediate transfer belt 8 (belt skew correction) based on the detection result. By contrast, in FIG. 4A, when the intermediate transfer belt 8 drifts to the left (belt skew towards the left), the correction roller 13 is swingably moved in the direction X2, thereby correcting displacement of the intermediate transfer belt 8 (belt skew correction) based on the detection result. Accordingly, belt failures such as belt skew of the intermediate transfer belt 8 and undesirable contact with other devices due to significant displacement of the intermediate transfer belt in the width direction thereof are suppressed, if not prevented entirely.

With reference to FIGS. 6 through 8, a description is provided of the correction devices 31 through 39, which are also collectively referred to as a belt skew correction mechanism, employed in the intermediate transfer belt assembly 15.

The correction devices 31 through 39 (the belt skew correction mechanism) correct belt skew of the intermediate transfer belt 8 in such a manner that an inclination of the rotary shaft of the correction roller 13 is changed by moving one end of the correction roller 13 (which is at the left side in FIG. 4A corresponding to the distal side of the device) in vertical directions or up-and-down directions with the other end of the correction roller 13 (which is at the right side in FIG. 4 corresponding to the proximal side (operation side) of the device) being fixed. For the sake of convenience, the fixed end of the correction roller 13 at the right side in FIGS. 4A and 4B is referred to as a first end, and the other end thereof subjected to be moved is referred to as a second end.

As illustrated in FIGS. 4A and 4B, and 6, the belt skew correction mechanism includes the correction roller 13, which is one of the plurality of rollers around which the intermediate transfer belt 8 is entrained, the swingable arm 31, the wire 33, a tension spring 35, a wire retaining pulley 32, a wire relay pulley 36, a two-stage pulley 37, a drive pulley 38, a timing belt 39, and so forth.

The swingable arm 31 is formed of a metal plate connected to a shaft portion 13*b* (shaft portion at the second end) of the correction roller 13. More specifically, as illustrated in FIG. 6, one end of the swingable arm 31 is connected to the shaft portion 13*b* of the correction roller 13 via a bearing 34. The wire retaining pulley 32 is held by the other end of the swingable arm 31 and is not rotatable. A center 31*b* of the swingable arm 31, which is a center of swingable move of the swingable arm 31, is rotatably supported by the second frame 90 (shown in FIGS. 7 and 11) of the intermediate transfer belt assembly 15.

In the present illustrative embodiment, one end of a biasing member, i.e., the tension spring 35, is connected to the swingable arm 31 between the shaft portion 13*b* and the center 31*b*.

The other end of the tension spring 35 is connected to the second frame 90 of the intermediate transfer belt assembly 15.

As illustrated in FIG. 6, one end of the wire 33 is connected to the wire retaining pulley 32. The two-stage pulley 37 includes a first pulley 37*a* and a second pulley 37*b*. The other end of the wire 33 is connected, via the wire relay pulley 36, to the first pulley 37*a* which winds up the wire 33. The timing belt 39 is entrained around the second pulley 37*b* of the two-stage pulley 37 and the drive pulley 38. The drive pulley 38 is disposed on a motor shaft of a drive motor, i.e., a motor that can rotate in the forward and backward directions such as a stepping motor, a DC motor, and so forth. As illustrated in FIG. 8, the drive pulley 38 (drive motor) is fixed to a retaining plate 91. The second frame 90 holds rotatably the retaining plate 91 about a support shaft 91*a*. The retaining plate 91 is biased by a biasing member, i.e., a spring 92, thereby providing predetermined tension to the timing belt 39. A hook of the spring 92 on one end is connected to the retaining plate 91, and another hook on the other end is connected to the second frame 90.

With this configuration, rotation of the drive pulley 38 driven by the drive motor enables the swingable arm 31 to swingably move in the forward and backward directions (i.e., X1 and X2 directions or M1 and M2 directions in FIG. 6), thereby changing the inclination of the rotary shaft of the correction roller 13 relative to the traveling direction of the intermediate transfer belt 8 and hence correcting belt skew of the intermediate transfer belt 8.

More specifically, referring back to FIG. 3, in the present illustrative embodiment the correction roller 13 is disposed upstream from the photosensitive drum 1 but downstream from the secondary transfer roller 19 in the traveling direction of the intermediate transfer belt 8. The detector 80 is disposed downstream from the drive roller 12A (and the photosensitive drum 1) but upstream from the secondary transfer roller 19 in the traveling direction of the intermediate transfer belt 8. With this configuration, the belt skew can be effectively corrected by the correction roller 13 based on the detection result provided by the detector 80 without affecting primary transfer and secondary transfer of an image.

More specifically, as the two-stage pulley 37 is driven to rotate in the counterclockwise direction in FIG. 6 (and FIG. 8) by the drive pulley 38, the first pulley 37*a* of the two-stage pulley 37 winds up the wire 33 while being tensioned. Consequently, the wire retaining pulley 32, which does not rotate, is pulled down, thereby pushing down the swingable arm 31 in the M1 direction (forward direction) against the biasing force of the tension spring 35. Accordingly, the correction roller 13 swingably moves about the center W in the X1 direction in FIG. 6.

By contrast, as the two-stage pulley 37 is driven to rotate in the clockwise direction in FIG. 6 (and FIG. 8) by the drive pulley 38, winding of the wire 33 by the first pulley 37*a* of the two-stage pulley 37 is released so that the wire 33 slackens between the two-stage pulley 37 and the wire retaining pulley 32. Consequently, the swingable arm 31 is pushed up in the M2 direction (reverse direction) by the spring force of the tension spring 35. Accordingly, the correction roller 13 swingably moves about the center W in the X2 direction in FIG. 6.

As illustrated in FIG. 7, a detection target 93 (feeler) is disposed on the swingable arm 31. The intermediate transfer belt assembly 15 includes a position detector (photodetector) 94 that optically detects the position of the detection target 93. With this configuration, the position of the swingable arm 31 in the direction of rotation is identified, thereby controlling accurately an amount of movement of the correction roller 13 in the X1 and X2 directions.

In the present illustrative embodiment, the inclination of the correction roller 13 is changed using a wire assembly as a correction device. However, the correction device is not limited to the wire assembly, but may be a device using a cam.

With reference to FIG. 9, a description is now provided of the adjustment mechanism of the intermediate transfer belt assembly 15.

As illustrated in FIG. 9, the first end (proximal side) of the correction roller 13, that is, a shaft portion 13*a*, is provided with the adjuster 67. The adjuster 67 as an adjustment mechanism adjusts the position of the first end of the correction roller 13, that is, the fixed end of the correction roller 13. More specifically, the shaft portion 13*a* (fixed end) of the correction roller 13 is rotatably supported by the first frame 70 of the intermediate transfer belt assembly 15 via the adjuster 67. The adjuster 67 is rotatably supported by the first frame 70 about a support shaft 67*b*. The adjuster 67 includes a slot 67*a* which is an elongated hole formed substantially in the shape of circular arc. The first frame 70 of the intermediate transfer belt assembly 15 includes a slot 70*a* which is an elongated hole into which the shaft portion 13*a* of the correction roller 13 at the fixed end fits.

With this configuration, after the shaft portion 13*a* at the first end (fixed end) of the correction roller 13 is moved together with the adjuster 67 in directions Q1 and Q2, a screw 68 is threaded through an internal thread of the first frame 70 via the slot 67*a* formed in the adjuster 67, thereby fixing the position of the adjuster 67 in the direction of rotation and hence fixing the position of the shaft portion 13*a* at the fixed end in the direction of rotary movement.

In a case in which a default position (reference position) of the correction roller 13 is out of the center of range of movement in the forward or the backward directions due to events described later, the adjuster 67 is manually operated to bring the default position back to the center. The events include, for example, when the intermediate transfer belt 8 is mounted in the intermediate transfer belt assembly 15 while parallelism between the plurality of rollers 9, 11, 12A through 12E, 13, and 14 around which the intermediate transfer belt 8 is entrained is poor; when the frames 70 and 90 (support members) rotatably supporting the plurality of rollers 9, 11, 12A through 12E, 13, and 14 are deformed; and when straightness of the plurality of rollers 9, 11, 12A through 12E, 13, and 14 is poor. More specifically, the adjuster 67 is manually operated to bring the default position of the correction roller 13 to the center of range of movement by a technician at a final stage of assembly of the intermediate transfer belt assembly 15 at a manufacturer. In a case in which the default position of the correction roller 13 shifts off form the center of range of movement due to deformation of the frames 70 and 90, or the like after shipment, the adjuster 67 is also operated manually by a technician.

With this configuration, the operation of the intermediate transfer belt assembly 15 is prevented from getting stopped because it is determined that belt skew was not corrected within a predetermined time period and hence a control error occurred. Furthermore, this configuration prevents insufficient correction of belt skew of the intermediate transfer belt 8 due to an inadequate range of movement of the correction roller 13 in either the forward or the backward directions.

It is to be noted that the adjuster 67 that adjusts the position of the shaft portion 13*a* of the correction roller 13 is not limited to the above described embodiment, and various variations and modifications may be made without departing from the scope of the present disclosure.

With reference to FIG. 10, a description is provided of another example of the adjuster 67. FIG. 10 is a perspective view schematically illustrating another example of the adjuster 67 near the correction roller 13 as viewed from the proximal side.

The adjuster 67 shown in FIG. 10 has substantially the same configuration as the adjuster 67 shown in FIG. 9 except for the following structures: the support shaft 67*b* (center of rotation) of the adjuster 67 is disposed near the correction roller 13 (shaft portion 13*a*); the screw 68 for fastening the adjuster 67 to the first frame 70 of the intermediate transfer belt assembly 15 is spaced apart from the correction roller 13 (shaft portion 13*a*); the adjuster 67 includes a pressing plate 69 to prevent a shaft bearing of the correction roller 13 (shaft portion 13*a*) from falling; and so forth. Furthermore, an adjustment scale 67*c* indicating positions (adjustment amount) of the adjuster 67 in the direction of rotary movement relative to the first frame 70 are carved on the adjuster 67 as illustrated in FIG. 10, thereby adjusting efficiently the correction roller 13 described above.

In FIGS. 9 and 10, as an adjustment mechanism, the elongated hole, i.e., the slot 70*a* formed substantially in the shape of circular arc is formed in the first frame 70 to fit with the shaft portion 13*a* of the correction roller 13. Alternatively, a linear long hole extending linearly in the vertical direction (up and down direction) that fits with the shaft portion 13*a* of the correction roller 13 may be formed in the first frame 70, thereby positioning the shaft portion 13*a* in place in the elongated hole and fixing the position thereof using the pressing plate 69 or the like.

With reference to FIGS. 11 through 15, a description is provided of characteristics of the image forming apparatus and the intermediate transfer belt assembly 15 according to the illustrative embodiment of the present disclosure.

According to the illustrative embodiment, the intermediate transfer belt assembly 15 (belt assembly) is detachably attachable relative to the main body 100.

Figure 11:
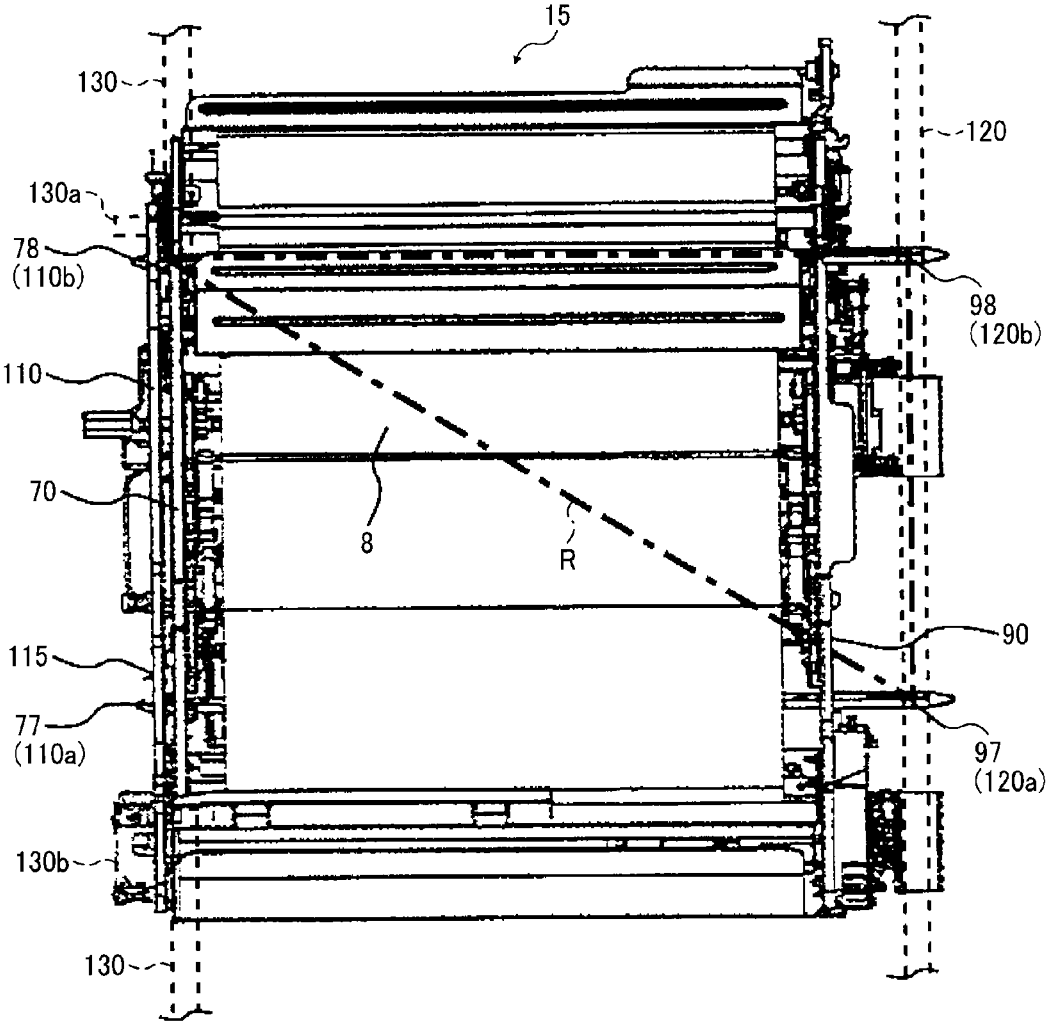
FIG. 11 is a top view schematically illustrating the belt assembly in an installed state in which the belt assembly is installed in the image forming apparatus.

More specifically, after a face plate 110 (a first support member of the main body 100 side) is removed from the main body 100 by users or a technician, the intermediate transfer belt assembly 15 is moved manually to the left in FIG. 11 (along the width direction from the distal side towards the proximal side), thereby allowing the intermediate transfer belt assembly 15 to be detached from the main body 100. For installation of the intermediate transfer belt assembly 15, the intermediate transfer belt assembly 15 is moved to the right in FIG. 11 (along the width direction from the proximal side to the distal side) so as to be mounted in the main body 100.

It is to be noted that in the present specification a state in which the belt assembly is disposed detachably attachable relative to the main body of the image forming apparatus is not limited to a state in which the belt assembly is completely detached from the image forming apparatus, but includes a state in which the belt assembly is partially exposed from the main body along a slider rail or the like.

As described above, the intermediate transfer belt assembly 15 includes the intermediate transfer belt 8 entrained around and supported by nine rollers 9, 11, 12A through 12E, 13, and 14. As illustrated in FIGS. 11 through 14, the intermediate transfer belt assembly 15 includes the first frame 70 (front frame) serving as the first support member and the second frame 90 (rear frame) serving as the second support member of the intermediate transfer belt assembly 15. The first frame 70 supports each shaft of nine rollers 9, 11, 12A through 12E, 13, and 14 on the first end side in the width direction. The second frame 90 supports each shaft of nine rollers 9, 11, 12A through 12E, 13, and 14 on the other side or the second end side in the width direction.

That is, the nine rollers 9, 11, 12A through 12E, 13, and 14 are rotatably supported by the first frame 70 and the second frame 90 disposed at each end of the rollers in the width direction thereof. The intermediate transfer belt 8 is entrained around and supported by the nine rollers 9, 11, 12A through 12E, 13, and 14 between two frames, that is, the first frame 70 and the second frame 90.

In the present illustrative embodiment, the first frame 70 and the second frame 90, a main-body front lateral plate 130, a main-body rear lateral plate 120, and an adjustment plate 115 are made of a metal planar member, for example, a galvanized steel sheet, having a thickness of approximately 1 mm to 3 mm.

The main body 100 fixedly supports the second frame 90 as the second support member of the intermediate transfer belt assembly 15 and supports the first frame 70 as the first support member such that the position of the first frame 70 can be changed in the direction of twist and fixedly supported. That is, the first frame 70 (first support member) can rotate within the plane facing the second frame 90.

The main body 100 of the image forming apparatus includes the face plate 110 and a main-body rear lateral plate 120. The first frame 70 (first support member) of the intermediate transfer belt assembly 15 is fitted to and supported by a main reference and a sub-reference at the first end side of the face plate 110 serving as a first support member on the main body side. The second frame 90 (second support member) of the intermediate transfer belt assembly 15 is fitted to and supported by a main reference and a sub-reference at the second end side of the main-body rear lateral plate 120, the positions of which are fixed.

More specifically, as illustrated in FIG. 11, the frame 90 of the intermediate transfer belt assembly 15 includes a pair of a main reference pin 97 and a sub-reference pin 98 projecting from the plane of the frame 90. The main reference pin 97 and the sub-reference pin 98 are spaced apart in the vertical (up-down) direction in FIG. 11. The main-body rear lateral plate 120 (second support member on the main body side) constituting a part of housing of the main body 100 of the image forming apparatus includes a first hole 120*a* as the main reference and a second hole 120*b* as the sub-reference at the second end. The first hole 120*a* and the second hole 120*b* are spaced apart in the vertical direction in FIG. 11. The first hole 120*a* has a dimension substantially the same as the outer diameter of the main reference pin 97. The second hole 120*b* is an elongated hole having substantially the same dimension as the outer diameter of the sub-reference pin 98 in the short direction, and extending towards the center of the first hole 120*a* and greater in the dimension than the outer diameter of the sub-reference pin 98 in the longitudinal direction.

Upon installation of the intermediate transfer belt assembly 15 in the main body 100, the main reference pin 97 is fitted to the first hole 120*a* of the main-body rear lateral plate 120 of the main body 100, and the sub-reference pin 98 is fitted to the second hole 120*b* of the main-body rear lateral plate 120, thereby positioning the second frame 90 of the intermediate transfer belt assembly 15 in place relative to the main body 100.

In the present illustrative embodiment, the main reference pin 97 (first hole 120) is disposed in proximity to the photosensitive drum 1 and the drive roller 12A. In other words, the main reference pin 97 is spaced apart from the correction roller 13. The sub-reference pin 98 (second hole 120*b*) is disposed in proximity to the correction roller 13 and the secondary transfer roller 19. Because the photosensitive drum 1 is positioned in place and fixed to the image forming apparatus, arranging the main reference pin 97 (first hole 120*a*) near the photosensitive drum 1 facilitates positioning of the intermediate transfer belt assembly 15 relative to the photosensitive drum 1.

Figure 12:
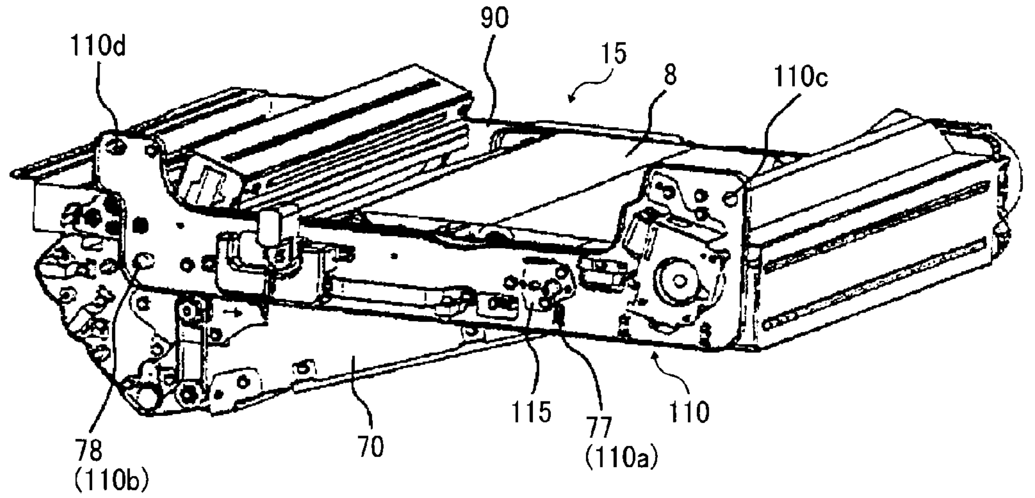
FIG. 12 is a perspective view schematically illustrating the belt assembly in the installed state.
Figure 13:
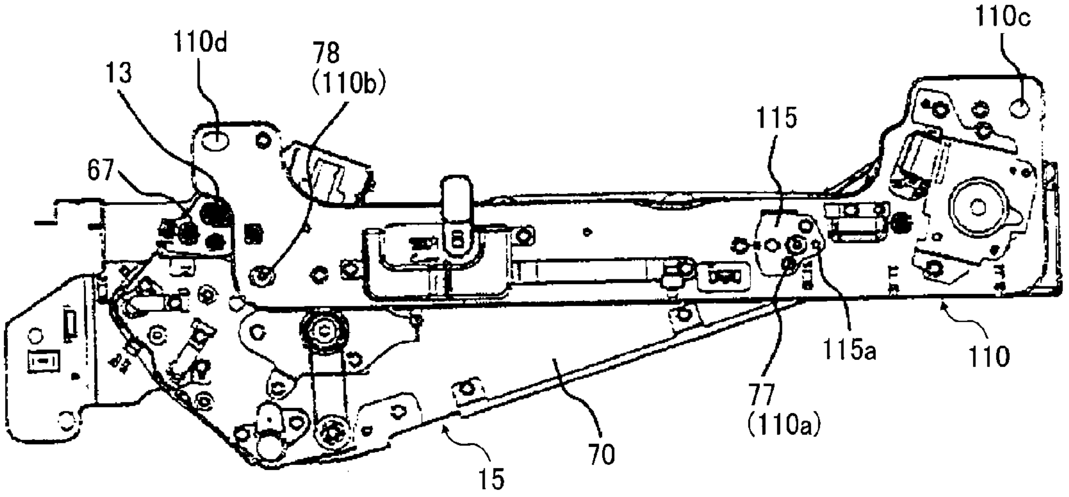
FIG. 13 is a front view schematically illustrating the belt assembly in the installed state.

As illustrated in FIGS. 11 through 13, the first frame 70 of the intermediate transfer belt assembly 15 includes a pair of a main reference pin 77 and a sub-reference pin 78 projecting from the plane of the first frame 70. The main reference pin 77 and the sub-reference pin 78 are spaced apart in the vertical (up-down) direction in FIG. 11. The face plate 110 (first support member on the main body side) constituting a part of housing of the main body 100 of the image forming apparatus includes a first hole 110*a* as the main reference at the first end for adjustment, and a second hole 110*b* as the sub-reference at the first end. The first hole 110*a* and the second hole 110*b* are spaced apart in the vertical direction in FIG. 11. The first hole 110*a* is an elongated hole and serves as a positioning main reference for a later-described adjustment plate 115. The second hole 110*b* is an elongated hole having substantially the same dimension as the outer diameter of the sub-reference pin 78 in the short direction and extending towards the center of the first hole 110*a* in the longitudinal direction, greater in the dimension than the outer diameter of the sub-reference pin 78.

In the present illustrative embodiment, the face plate 110 (first support member on the main body side) is a relay member fixed to and held by a main reference pin 130*a* as a main reference and a sub-reference pin 130*b* as a sub-reference of the main-body front lateral plate 130 of the main body 100.

Figure 14:
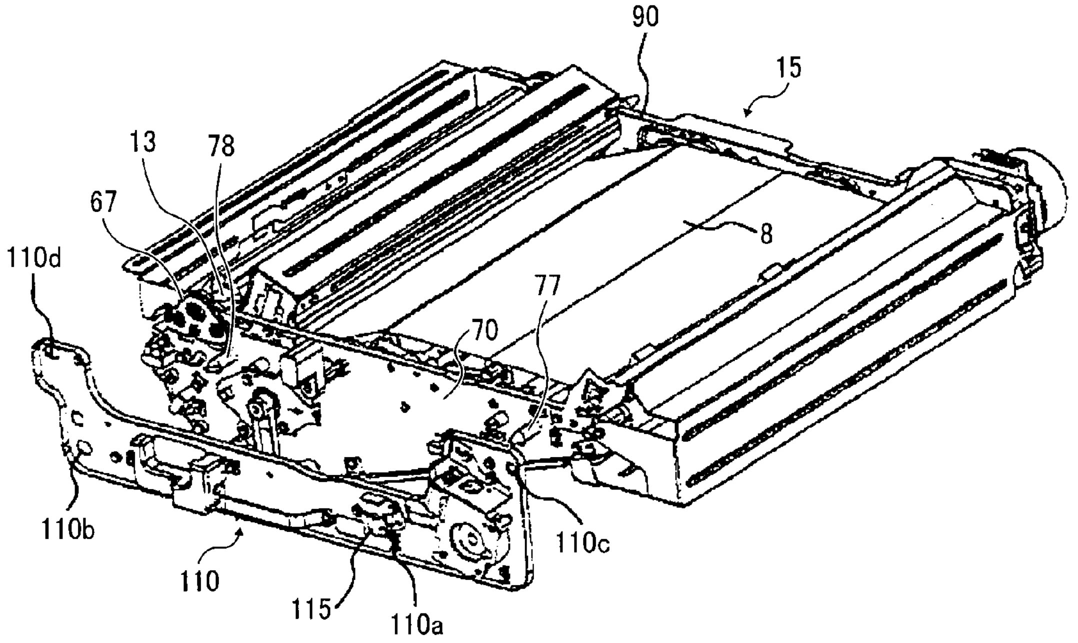
FIG. 14 is a perspective view schematically illustrating the belt assembly in the installed state.

More specifically, as illustrated in FIGS. 12 through 14, the face plate 110 includes two other holes spaced apart from each other: a third hole 110*c* serving as a main reference and a fourth hole (elongated hole) 110*d* serving as a sub-reference. Referring back to FIG. 11, the main-body front lateral plate 130 constituting a part of the housing of the main body 100 includes a pair of main reference pin 130*a* and a sub-reference pin 130*b* projecting from the plane of the main-body front lateral plate 130. The main reference pin 130*a* and the sub-reference pin 130*b* serve as a positioning member and are spaced apart in the vertical (up-down) direction in FIG. 11.

The third hole 110*c* has a dimension substantially the same as the outer diameter of the main reference pin of the main-body front lateral plate 130. The fourth hole 110*d* is an elongated hole having substantially the same dimension as the outer diameter of the sub-reference pin of the main-body front lateral plate 130 in the short direction, and greater in the dimension than the outer diameter of the sub-reference pin of the main-body front lateral plate 130 in the longitudinal direction towards the third hole 110*c*.

Upon installation of the intermediate transfer belt assembly 15 in the main body 100, in a state in which the second frame 90 of the intermediate transfer belt assembly 15 is positioned in place relative to the main body 100 and the main reference pin 77 is fitted to the first hole 110*a* (hole in the adjustment plate 115) of the face plate 110 so that the sub-reference pin 78 is fitted to the second hole 110*b* of the face plate 110 (that is, fitting operation from the state shown in FIG. 14 to the installed state shown FIG. 12), the main reference pin 130*a* of the main-body front lateral plate 130 is fitted to the third hole 110*c* of the face plate 110 and the sub-reference pin 130*b* of the main-body front lateral plate 130 is fitted to the second hole 110*b* of the face plate 110. Accordingly, the first frame 70 of the intermediate transfer belt assembly 15 is positioned in place relative to the main body 100.

In the present illustrative embodiment, the main reference pin 77 (first hole 110*a*) is disposed in proximity to the photosensitive drum 1 and the drive roller 12A. In other words, the main reference pin 77 is spaced apart from the correction roller 13. The sub-reference pin 78 (second hole 110*b*) is disposed in proximity to the correction roller 13 and the secondary transfer roller 19. Because the photosensitive drum 1 is positioned in place and fixed to the image forming apparatus, arranging the main reference pin 77 (first hole 110*a*) near the photosensitive drum 15 facilitates positioning of the intermediate transfer belt assembly 15 relative to the photosensitive drum 1.

As described above, the face plate 110 is detachably attachable relative to the main body 100. More specifically, the face plate 110 is detachably attachable relative to the main-body front lateral plate 130. Furthermore, the face plate 110 is also detachably attachable relative to the main body 100, independent of the intermediate transfer belt assembly 15. This configuration enhances operability of detachment and installation of the intermediate transfer belt assembly 15 relative to the main body 100.

As illustrated in FIGS. 12 and 13, according to the illustrative embodiment, one of the main reference and the sub-reference at the first end side of the face plate 110 as the first support member on the main body side is fixed, and the adjustment plate 115 serving as an adjustment mechanism is disposed on another of the main reference and the sub-reference to change the position of the another of the main reference and the sub-reference on a plane perpendicular to the width direction. More specifically, as described above, the second hole 110*b* as the sub-reference at the first end side is formed in the face plate 110 at a fixed position.

Figure 15A:
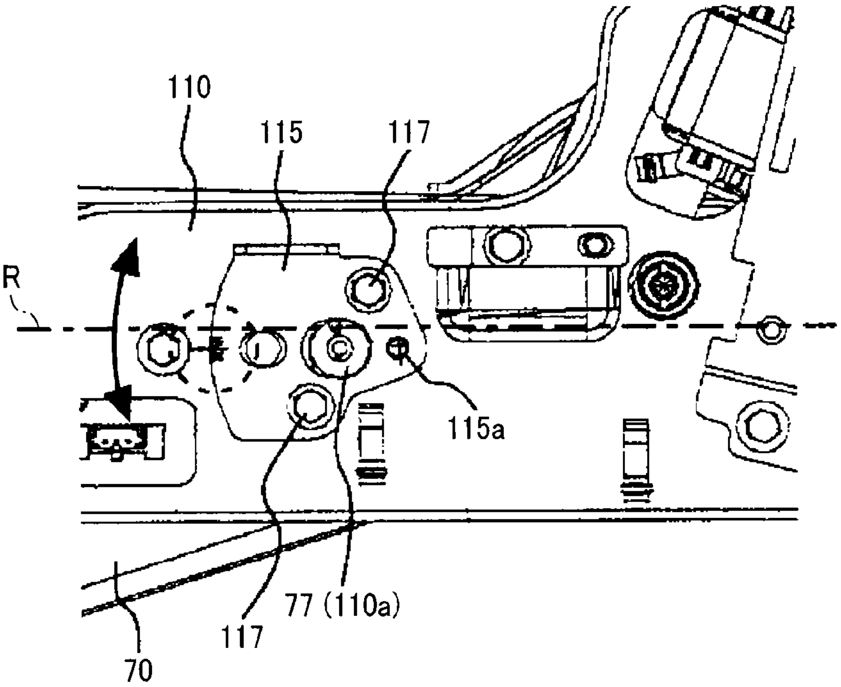
FIG. 15A is a front view schematically illustrating an adjustment mechanism of a first support on the main body side.

By contrast, the main reference at the first end is a hole in the face plate 110 at which the first hole 110*a* for adjustment and the hole (positioning hole) in the adjustment plate 115 overlap. The face plate 110 supports rotatably the adjustment plate 115 about a support shaft 115*a* so that the adjustment plate 115 can rotatably move along the surface of the face plate 110 in the direction of two-way arrow shown in FIG. 15A. As illustrated in FIG. 15A, the adjustment plate 115 includes a hole overlapping with the first hole 110*a* which extends linearly (or in the shape of circular arc) in the vertical direction and having a size substantially the same as the outer diameter of the main reference pin 77, a hole with a diameter larger than the screw diameter for fastening a screw 117 and fixing the adjustment plate 115 at a desired rotation position on the face plate 110, and an adjustment scale that shows a position (adjustment amount) of the adjustment plate 115 in the direction of rotation thereof relative to the face plate 110 indicated by a dotted circle.

Figure 15B:
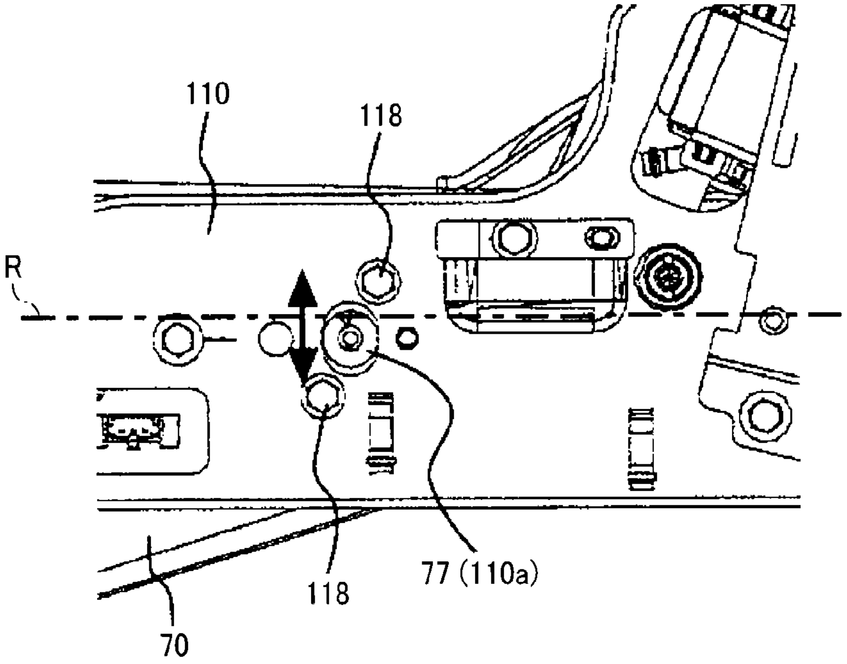
FIG. 15B is a front view schematically illustrating the adjustment mechanism removed from the first support.

As illustrated in FIG. 15B, the face plate 110 includes the first hole 110*a* which is an elongated hole extending in the longitudinal direction indicated by a two-way arrow in FIG. 15B and an internal thread portion 118 for fastening the screw 117 and fixing the adjustment plate 115 at a desired rotation position on the face plate 110.

With this configuration, the adjustment plate 115 is rotated about the support shaft 115*a* along the surface of the face plate 110, thereby changing the position at which the first hole 110*a* and the hole (positioning hole) of the adjustment plate 115 overlap so as to adjust the position of the main reference at the first end side of the face plate 110.

By adjusting the position of the main reference at the first end side of the face plate 110 by the adjustment plate (adjustment mechanism) 115, the position of the first frame 70 can be changed by a desired amount in the direction of twist relative to the second frame 90 which is fixedly supported by the main body 100. Accordingly, the first frame 70 of the intermediate transfer belt assembly 15 is fixedly supported by the main body 100. In other words, by adjusting the position of the main reference of the face plate 110 at the first end side by the adjustment plate 115, the sub-reference at the first end side, the main reference at the second end side, and the sub-reference at the second end side are fixed, and the positional relations (relations of twisting position) of the two frames, i.e., the first frame 70 and the second frame 90, are determined. The twisting position is described later in detail.

Furthermore, by adjusting the position of the main reference of the face plate 110 at the first end side by the adjustment plate 115, the main reference at the first end side is moved with the sub-reference at the first end side being at the center while the second end side is fixed. Accordingly, the positional relations (relations of twisting position) of the two frames, i.e., the first frame 70 and the second frame 90, are determined.

Next, a description is provided of the direction of twist. For the sake of convenience, the positions at which each reference pin (positioning portion) is fixedly supported by each reference are referred to as the sub-reference at the first end side, the main reference at the second end side, the sub-reference at the second end side, and the main reference at the first end side.

Where an imaginary plane passing through the sub-reference at the first end side, the main reference at the second end side, and the sub reference at the second end side is referred to as R, a direction of twist is a direction in which the main reference at the first end side is moved in the direction of the normal vector towards the imaginary surface R. The imaginary plane R coincides with a plane substantially parallel to the sheet plane of FIG. 11.

For example, when assuming that the frames 70 and 90, the face plate 110, and so forth are not mounted at desired target positions in the main body 100 due to dimension errors and assembling errors upon manufacturing of constituent parts of the frames 70 and 90, the face plate 110, and so forth, the main reference at the first end side relative to imaginary plane R is out of alignment with respect to the target position (for example, the position within the imaginary plane R) as viewed from the intermediate transfer belt 8 of the intermediate transfer belt assembly 15. Similarly, the position of the intermediate transfer belt 8 of the transfer belt unit 15 is out of alignment with respect to the target position as viewed from the main body 100. As a result, a deviation occurs in the tension of the intermediate transfer belt 8 of the intermediate transfer belt assembly 15 mounted in the main body 100 in the width direction.

In the present illustrative embodiment, the adjustment plate 115 is rotatably moved about the support shaft 115*a* along the surface of the face plate 110, thereby moving the main reference at the first end side in the direction of the normal vector of the imaginary plane R (i.e., in the direction substantially perpendicular to the sheet plane of FIG. 11 which coincides with the vertical direction in FIGS. 15A and 15B). By moving the main reference at the first end side, the main reference at the first end side relative to the imaginary plane R is moved to the target position (the position within the imaginary plane R) as viewed from the intermediate transfer belt 8. Accordingly, the deviation of the tension of the intermediate transfer belt 8 in the width direction is reduced.

Alternatively, the target position of the main reference at the first end side may be spaced apart a predetermined distance in the direction of the normal vector as viewed from the imaginary plane R.

The direction of movement of the main reference at the first end side moved by the adjustment plate 115 may not have to coincide completely with the direction of the normal vector of the imaginary plane R. Alternatively, the direction of movement thereof may be a direction in which the main reference at the first end side approaches or separates from the imaginary plane R. A trajectory of movement of the adjustment plate 115 may be a straight line or a circular arc. As long as the direction of movement of the main reference at the first end side moved by the adjustment plate 115 includes a component of the imaginary plane R in the direction of the normal vector, the deviation of the tension of the intermediate transfer belt 8 in the width direction is reduced.

The adjustment plate 115 is configured to adjust the fixation position of the main reference at the first end side towards and away from the imaginary plane R while the sub-reference at the first end side, the main reference at the second end side, and the sub-reference at the second end side are fixed, thereby allowing adjustment with a simple configuration.

With this configuration, even when the intermediate transfer belt assembly 15 is not properly installed in the main body 100 due to dimensional errors and assembly errors of various parts that support the intermediate transfer belt assembly 15 in the main body 100 such as the first frame 70, the second frame 90, the plurality of rollers 9, 11, 12A through 12E, 13, and 14, and so forth, and the belt skew of the intermediate transfer belt 8 is not corrected by the correction roller 13 despite the adjustment of the belt skew by the adjuster 67 within the intermediate transfer belt assembly 15 alone, the adjustment plate 115 can move the first frame 70 of the intermediate transfer belt unit 15 in the direction of twist relative to the second frame 90, thereby correcting such a state. That is, the installation of the intermediate transfer belt assembly 15 can be corrected relative to the main body 100 to an extent in which the correction roller 13 can adequately correct the belt skew of the intermediate transfer belt 8. The adjustment plate 115 can adjust the positions of the plurality of rollers 9, 11, 12A through 12E, 13, and 14 all together at the first end side so that the degree of tolerance of the correction of the belt skew by the correction roller 13 is significantly enhanced as compared with the correction operation of the correction roller 13 in the intermediate transfer belt assembly 15 alone and the adjustment by the adjuster 67.

It is to be noted that instead of adjusting the positions of the plurality of rollers 9, 11, 12A through 12E, 13, and 14 all together at the first end side, two or more rollers among the plurality of rollers 9, 11, 12A through 12E, 13, and 14 may be adjusted together. This configuration also enhances significantly the degree of tolerance of the correction of the belt skew by the correction roller 13 as compared with the correction operation of the correction roller 13 alone in the intermediate transfer belt assembly 15 and adjustment by the adjuster 67.

Alternatively, the frame 70 supporting the plurality of rollers 9, 11, 12A through 12E, 13, and 14 at the first end side may be molded into a single frame, or a plurality of sub-frames may constitute the frame 70.

Furthermore, according to the present illustrative embodiment, the correction roller 13 can reliably correct the belt skew of the intermediate transfer belt 8 while reducing the deviation of the tension of the intermediate transfer belt 8 in the width direction thereof, thereby preventing imaging failure. In other words, changing the position of the first frame 70 in the direction of twist relative to the second frame 90 by the adjustment plate 115 can change an apparent circumferential length of the intermediate transfer belt 8 at the first end side in the width direction relative to the circumferential length at the second end side in the width direction thereof, thereby preventing misinstallation of the intermediate transfer belt assembly 15 in the main body 100 and hence reducing the deviation of the tension of the intermediate transfer belt 8 in the width direction.

More specifically, in the image forming apparatus of the present illustrative embodiment, a single image forming unit, that is, the image forming unit 6, is disposed opposite the intermediate transfer belt 8 as opposed to a known color-image forming apparatus such as proposed in JP-2009-145765-A in which four image forming units are arranged in tandem facing the intermediate transfer belt. Thus, the circumferential length of the intermediate transfer belt 8 is relatively short in the present illustrative embodiment, and the outer tension roller 11 is disposed outside the looped belt at the downstream side near the correction roller 13. The deviation of the tension of the intermediate transfer belt 8 tends to be large in this type of image forming apparatus so that the present disclosure is especially effective.

According to the present illustrative embodiment, the adjustment plate 115 is disposed at the main reference of the face plate 110 (first support member on the main body side) at the first end side. Alternatively, the adjustment plate 115 may be disposed at the sub-reference of the face plate 110 at the first end side. Still alternatively, the adjustment plate 115 may be disposed at the main reference of the main-body rear lateral plate 120 (second support member on the main body side) at the second end side or at the sub-reference of the main-body rear lateral plate 120 at the second end side. In this configuration, three references among the four references on the two frames, that is, the first frame 70 and the second frame 90 are fixed, and the remaining one reference is changed, thereby achieving the same effect as that of the illustrative embodiment of the present disclosure.

According to the present illustrative embodiment, the adjustment plate 115 is provided to one reference. Alternatively, the adjustment plate 115 may be provided to each of the plurality of references.

In the present illustrative embodiment, one of the main reference and the sub-reference of the face plate 110 at the first end side, closer to the rotary shaft of the correction roller 13, is fixed, and another of the main reference and the sub-reference located some distance from the rotary shaft of the correction roller 13 is provided with the adjustment plate 115 which changes the position of the respective roller within the plane perpendicular to the width direction.

Since the adjustment plate 115 is disposed at the main reference of the face plate 110 at the first end side located some distance from the correction roller 13, adjustment relative to the main body 100 and the intermediate transfer belt assembly 15 by the adjustment plate 115 (adjustment mechanism), adjustment in the intermediate transfer belt assembly 15 alone using the correction roller 13, and adjustment by the adjuster 67 are effectively performed to correct the belt skew of the intermediate transfer belt 8.

The adjustment plate 115 is disposed substantially at the front or proximal side (operating side) of the main body 100 of the image forming apparatus, thereby facilitating adjustment using the adjustment plate 115, as compared with disposing the adjustment plate 115 at the distal side of the main body 100 of the image forming apparatus.

The adjustment plate 115 is disposed some distance from the secondary transfer roller 19, but disposed in proximity to the photosensitive drum 1 in consideration of the fact that the secondary transfer roller 19 is biased against the intermediate transfer belt 8 to contact (follow) by a biasing member while the photosensitive drum 1 is positioned in place and fixedly supported by the main body 100. That is, the reference, the position of which is changeable by the adjustment plate 115, is located substantially near the photosensitive drum 1, thereby reducing an adverse effect (in particular, an effect upon primary transfer) on an image attributed to the adjustment by the adjustment plate 115. The reference, the position of which does not change even when adjustment by the adjustment plate 115 is performed, is disposed substantially near the secondary transfer roller 19 that follows the position of the intermediate transfer belt 8. Accordingly, an adverse effect on the image attributed to adjustment by the adjustment plate 115 (in particular, effect upon secondary transfer) can be reduced.

According to the present illustrative embodiment, the adjustment performed relative to the main body 100 and the intermediate transfer belt assembly 15 by the adjustment plate 115 and the adjustment by the intermediate transfer belt assembly 15 alone using the adjuster 67 are performed at a manufacturer by the following procedure, for example.

First, while the intermediate transfer belt assembly 15 is installed in the main body 100, deviation in pressure (deviation in front and rear pressure) of the primary transfer roller 9 against the photosensitive drum 1 in the width direction and the total pressure are measured. Subsequently, based on the measured result, adjustment is performed relative to the main body 100 and the intermediate transfer belt assembly 15 by the adjustment plate 115 to make the total pressure within a predetermined range and the deviation of pressure in the width direction minimum.

More specifically, in a case in which the pressure of the primary transfer roller 9 at the first end side (proximal side) in the width direction thereof relative to the photosensitive drum 1 is greater than the pressure at the second end side (distal side) in the width direction, the adjustment plate 115 shown in FIG. 15A is adjusted to rotate about the support shaft 115*a* in the clockwise direction. That is, the adjustment plate 115 is adjusted such that the main reference at the first end side is moved up. By contrast, in a case in which the pressure of the primary transfer roller 9 at the first end side (proximal side) in the width direction thereof relative to the photosensitive drum 1 is less than the pressure at the second end side (distal side) in the width direction, the adjustment plate 115 shown in FIG. 15A is adjusted to rotate about the support shaft 115*a* in the counterclockwise direction. That is, the adjustment plate 115 is adjusted such that the main reference at the first end side is moved down.

Subsequently, in the adjustment performed by the intermediate transfer belt assembly 15 alone as described above, the adjuster 67 adjusts the default position of the correction roller 13 to be at the center of the range of movement. Such adjustment by the intermediate transfer belt assembly 15 alone is performed when an adjustment amount of adjustment by the adjustment plate 115 exceeds a permissible range, in particular.

The main body 100 of the image forming apparatus in the present illustrative embodiment includes the main-body front lateral plate 130, the intermediate transfer belt assembly 15 equipped with the intermediate transfer belt 8 to bear a toner image and the plurality of rollers 12A through 12E, 11, 13, and 14 that supports the intermediate transfer belt 8, the pair of first positioning pins (i.e., the main reference pin 77 and the sub-reference pin 78) that positions the intermediate transfer belt assembly 15 in place relative to the main-body front lateral plate 130 at one side of the intermediate transfer belt 8 in the width direction thereof, the adjustment plate 115 (adjustment mechanism) that adjusts the position of one of the pair of first positioning pins 77 and 78 relative to another of the first positioning pins 77 and 78 (here, the main reference pin 77 is adjusted relative to the sub-reference pin 78), the pair of second positioning pins (i.e., the main reference pin 97 and the sub-reference pin 98) that positions the intermediate transfer belt assembly 15 in place relative to the main-body front lateral plate 130 at the second end side in the width direction of the intermediate transfer belt 8, the face plate 110 detachably attachable relative to the main-body front lateral plate 130, and so forth.

The adjustment plate 115 (adjustment mechanism) can adjust the position of one of the first positioning pins 77 and 78, that is, the sub-reference pin 78, while the position of the pair of the second positioning pins 97 and 98 is fixed. As illustrated in FIG. 14, the adjustment plate 115 can adjust the position of one of the pair of first positioning pins 77 and 78, that is, the main reference pin 77, in the direction perpendicular to the shaft of the plurality of rollers 12A through 12E, 11, 13, and 14. Furthermore, as illustrated in FIG. 15B, the adjustment plate 115 can adjust the position of one of the pair of first positioning pins 77 and 78, that is, the main reference pin 77 in the direction perpendicular to a straight line connecting the sub-reference pin 78 and the main reference pin 77 opposite the sub-reference pin 78.

As illustrated, for example, in FIG. 14, the intermediate transfer belt assembly 15 is detachably attachable relative to the main-body front lateral plate 130 in the width direction of the intermediate transfer belt 8. The intermediate transfer belt assembly 15 is positioned in place relative to the main-body front lateral plate 130 via the face plate 110 which is provided with the adjustment plate 115.

According to the present illustrative embodiment, the face plate 110 as the first support member on the main body side includes the adjustment plate 115 as the adjustment mechanism.

Figure 16:
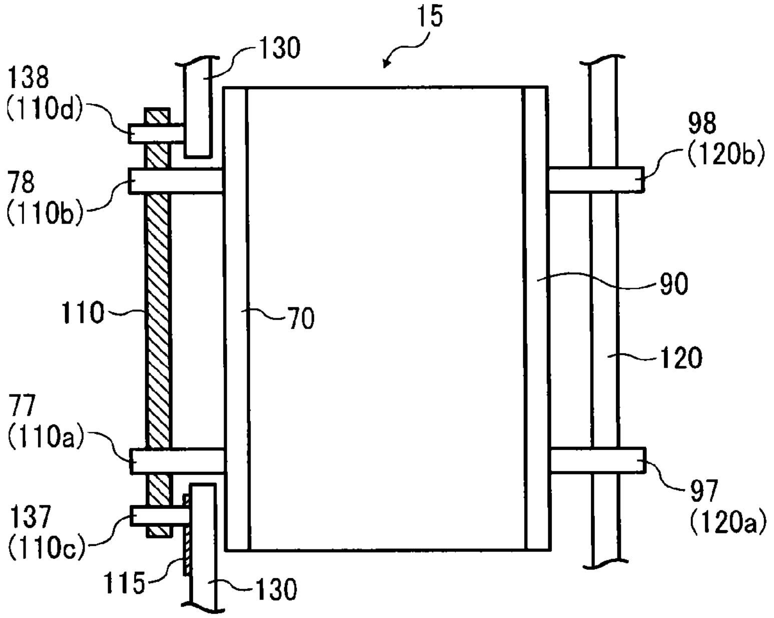
FIG. 16 is a top view schematically illustrating the belt assembly in the installed state according to a first variation.
Figure 17:
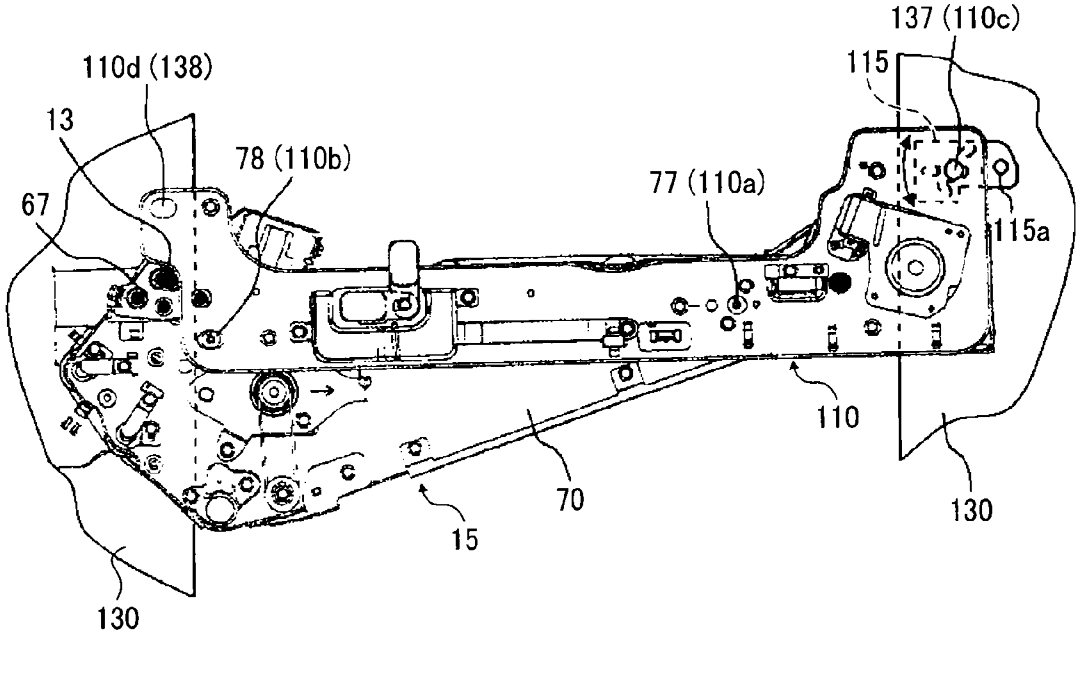
FIG. 17 is a front view schematically illustrating the belt assembly of FIG. 16 as viewed from a face plate.

Alternatively, as illustrated in FIGS. 16 and 17, the main-body front lateral plate 130 constituting a part of the housing may include the adjustment plate 115. FIG. 17 illustrates the intermediate transfer assembly of the present illustrative embodiment described above corresponding to FIG. 13.

In the present illustrative embodiment, the main-body front lateral plate 130 of the main body 100 includes a main reference pin 137 and a sub-reference pin 138. As illustrated in FIGS. 16 and 17, the first frame 70 as the first support member of the belt assembly is fitted to and supported by the first hole 110*a* as the main reference at the first end side and the second hole 110*b* as the sub-reference at the first end side of the face plate 110. The main reference pin 137 is fitted to the third hole 110*c* of the face plate 110. The sub-reference pin 138 is fitted to the fourth hole 110*d* of the face plate 110. Accordingly, the face plate 110 is fixed and held by the main-body front lateral plate 130.

One of the main reference pin 137 and the sub-reference pin 138 of the main-body front lateral plate 130 (the sub-reference pin 138 in this example shown in FIGS. 16 and 17) is fixed, and the position of another of the main reference pin 137 and the sub-reference pin 138 (the main reference pin 137 in this example shown in FIGS. 16 and 17) is changeable on the plane perpendicular to the width direction by the adjustment plate 115 (adjustment mechanism) provided to the main-body front lateral plate 130.

In this configuration, three references among the four references on the two frames of the intermediate transfer belt assembly 15, that is, the first frame 70 and the second frame 90, are fixed, and the position of only one reference is changed in relation with the main body 100 by the adjustment plate 115 provided to main-body front lateral plate 130, thereby achieving the same effect as that of the illustrative embodiment of the present disclosure. In other words, in the present illustrative embodiment shown in FIGS. 16 and 17, the adjustment plate 115 disposed on the main-body front lateral plate 130 is rotated about the support shaft 115*a* along the surface of the main-body front lateral plate 130 in the direction of two-way arrow in FIG. 17 and fixed or fastened by a screw at an optimum position.

The first frame 70 of the intermediate transfer belt assembly 15 is displaced in the direction of twist relative to the second frame 90, and fixed to and supported by the main body 100. Accordingly, distortion of the intermediate transfer belt assembly 15 relative to the main body 100 is corrected.

It is to be noted that in the examples shown in FIGS. 16 and 17, in order to allow adjustment by the adjustment plate 115 while the intermediate transfer belt assembly 15 and the face plate 110 are installed, the adjustment plate 115 is formed such that the position and the adjustment scale of the adjustment plate 115 for screw fastening are prevented from getting hidden by the face plate 110 as viewed from the front such as shown in FIG. 17.

According to the present illustrative embodiment, the first frame 70 as the first support member on the belt assembly side is fitted to the main reference and the sub-reference of the face plate 110 at the first end side as the first support member on the main body side. The face plate 110 is a relay member disposed between the main-body front lateral plate 130 and the intermediate transfer belt assembly 15, and includes the adjustment plate 115 as the adjustment mechanism.

Figure 18:
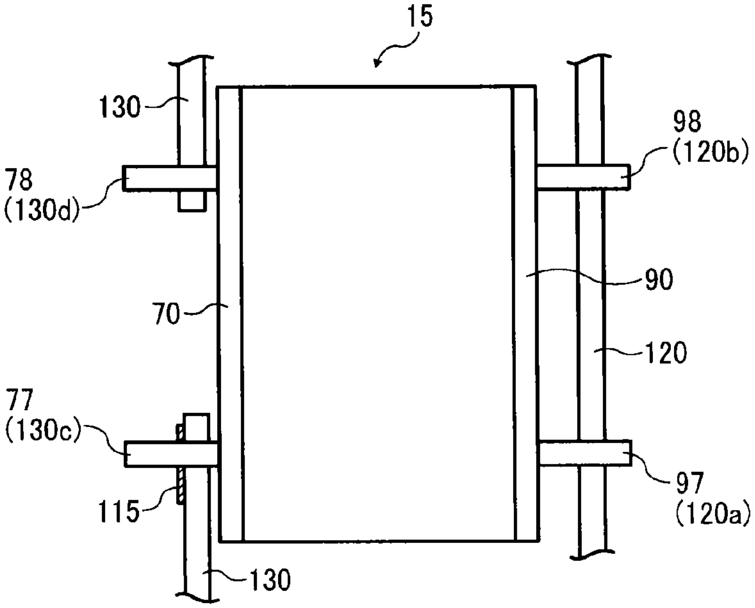
FIG. 18 is a top view schematically illustrating the belt assembly in the installed state according to a second variation.

Alternatively, as illustrated in FIG. 18, the main-body front lateral plate 130 (that is, the housing of the main body 100) may be used as the first support member on the main body side to support the first frame 70 of the belt assembly by fitting the first frame 70 to the main reference and the sub-reference at the first end side of the main-body front lateral plate 130. In this configuration, the adjustment plate 115 may be provided to the main-body front lateral plate 130.

More specifically, as illustrated in FIG. 18, the main reference pin 77 of the first frame 70 of the belt assembly is fitted to a main reference hole 130*c* in the main-body front lateral plate 130 at the first end side as the first support member on the main body side. The sub-reference pin 78 of the first frame 70 of the belt assembly is fitted a sub-reference 130*d* of the main-body front lateral plate 130 at the first end side as the first support member on the main body side. The main reference hole 130*c* and the sub-reference hole 130*d* are holes through which the pins 77 and 78 are inserted, respectively. The sub-reference 130*d* is an elongated hole. Accordingly, the main-body front lateral plate 130 supports the first frame 70.

One of the main reference hole 130*c* and the sub-reference hole (elongated hole) 130*d* of the main-body front lateral plate 130 (the sub-reference 130*d* in this example shown in FIG. 18) at the first end side is fixed, and the position of the other one of the main reference hole 130*c* and the sub-reference hole 130*d* (the main reference hole 130*c* in this example shown in FIG. 18) is changeable on the plane perpendicular to the width direction by the adjustment plate 115 (adjustment mechanism) provided to the main-body front lateral plate 130.

In this configuration, three references among the four references on the two frames of the intermediate transfer belt assembly 15, that is, the first frame 70 and the second frame 90, are fixed, and the position of only one reference is changed in relation with the main body 100 by the adjustment plate 115 provided to the main-body front lateral plate 130, thereby achieving the same effect as that of the illustrative embodiment of the present disclosure.

In the image forming apparatus constituted as illustrated in FIG. 18, the length of the reference pins 77, 78, 97, and 98 of the intermediate transfer belt assembly 15, a space between the lateral plates 120 and 130 of the main body side, and so forth are set suitably, thereby allowing the intermediate transfer belt assembly 15 to be constituted detachably attachable relative to the main body 100 of the image forming apparatus.

According to the present illustrative embodiment, in the image forming apparatus in which the intermediate transfer belt assembly 15 including the correction devices 31 through 39 (correction roller 13) and the adjuster 67 (adjustment mechanism) is detachably attachable relative to the main body 100, three references among four references of two frames 70 and 90 of the intermediate transfer belt assembly 15 are fixed, and one reference is changeable in relation with the main body 100.

Alternatively, a configuration, in which three references among four references of two frames 70 and 90 of the intermediate transfer belt assembly 15 are fixed and one reference is changeable in relation with the main body 100, may be applied to the image forming apparatus in which the intermediate transfer belt assembly 15 equipped with the correction devices 31 through 39 without the adjuster 67 (adjustment mechanism) is detachably attachable relative to the main body 100 and to the image forming apparatus in which the intermediate transfer belt assembly 15 including neither the correction devices 31 through 39 (correction roller 13) nor the adjuster 67 is detachably attachable relative to the main body 100 of the image forming apparatus. In such cases, the same effect as that of the other foregoing embodiments can be achieved.

Figure 19A:
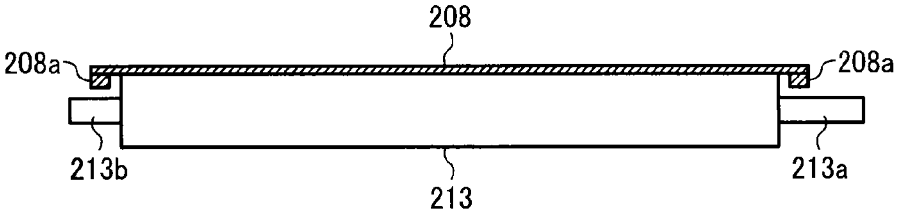
FIGS. 19A and 19B are lateral views schematically illustrating a roller of the belt assembly according to a third variation.

In particular, in a case in which intermediate transfer belt assembly 15 is not equipped with the correction devices 31 through 39 (correction roller 13), in order to reduce belt skew of an intermediate transfer belt 208, as illustrated in FIG. 19A, a projection 208*a* that contacts an end surface of a shaft portion (i.e., a portion formed on shaft portions 213*a* and 213*b*) of a roller 213 around which the intermediate transfer belt 208 is entrained is formed at both ends of the inner circumferential surface of the intermediate transfer belt 208 in the width direction thereof. The projection 208*a* contacts the end surfaces of the shaft portions 213*a* and 213*b* when the intermediate transfer belt 208 skews more than a predetermined permissible range.

Figure 19B:
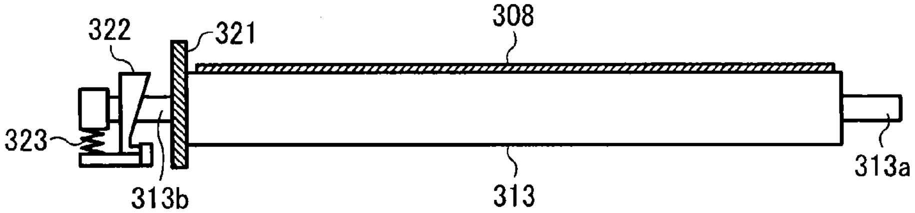

Furthermore, as illustrated in FIG. 19B, in a case in which an intermediate transfer belt 308 skews more than a predetermined permissible range, the intermediate transfer belt 308 comes into contact with a pulley 321 disposed on an end surface of shaft portions (i.e., a portion formed on shaft portions 313*a* and 313*b*) of a roller 313 around which the intermediate transfer belt 308 is entrained, producing a force transmitted to an arm 322. When the force thus produced is transmitted to the arm 322, the shaft portion 313*b* is pushed down attributed to the principle of leverage. A spring 323 or the like may be provided to offset such movement by its repulsive force in the direction of correcting the movement.

As described above, according to the present illustrative embodiment, the second frame 90 as the second support member on the intermediate transfer belt assembly (simply, belt assembly) side is fixed to the main body 100, and the first frame 70 as the first support member on the intermediate transfer belt assembly side can be moved in the direction of twist and fixed to the main body 100. With this configuration, in a state in which the intermediate transfer belt assembly 15 is detachably attachable relative to the main body 100, the intermediate transfer belt assembly 15 is positioned in place and installed correctly in the main body 100, thereby preventing deviations in the tension of the intermediate transfer belt 8 (belt member) in the width direction thereof and hence preventing imaging failure.

The present disclosure is applied to an image forming apparatus in which a belt assembly, i.e., the intermediate transfer belt assembly 15 including a belt such as the intermediate transfer belt 8 is detachably attachable relative to a main body, i.e., the main body 100, of the image forming apparatus. Furthermore, the present disclosure can be applied to an image forming apparatus in which a belt assembly including a belt such as a transfer conveyor belt is detachably attachable relative to the main body of the image forming apparatus. Here, the belt assembly is one in which a plurality of toner images of different colors is transferred onto a recording medium being conveyed on the conveyor belt. Furthermore, the present disclosure can be applied to an image forming apparatus in which a belt assembly including a belt such as a photosensitive belt is detachably attachable relative to the main body of the image forming apparatus. Here, the photosensitive belt is a looped photosensitive belt and functions in the same manner as the photosensitive drum of the present illustrative embodiment. In these cases, the position of the first support member is changeable in the direction of twist and fixedly supported while the second support member is fixed to the main body, thereby achieving effects equivalent to the effects provided by the illustrative embodiment of the present disclosure.

The present disclosure is applied to the main body 100 of the image forming apparatus in which one image forming unit 6 is disposed facing the intermediate transfer belt 8 (the intermediate transfer belt assembly 15). Alternatively, the present disclosure may be applied to an image forming apparatus in which a plurality of image forming units is disposed facing the intermediate transfer belt (intermediate transfer belt assembly). For example, the present disclosure may be applied to a known tandem-type color image forming apparatus such as in JP-2009-145765-A. In such a configuration, the same effect as that of the present illustrative embodiment can be achieved.

According to the present illustrative embodiment, the face plate 110 as the first support member on the main body side includes the adjustment plate 115 as an adjustment mechanism. The present disclosure can be applied to a configuration in which the intermediate transfer belt (intermediate transfer belt assembly) includes the adjustment plate 115 as the adjustment mechanism. In such a configuration, the same effect as that of the present illustrative embodiments can be achieved.

According to an aspect of this disclosure, the present invention is employed in the image forming apparatus. The image forming apparatus includes, but is not limited to, an electrophotographic image forming apparatus, a copier, a printer, a facsimile machine, and a digital multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An image forming apparatus, comprising:
a housing;
an adjuster; and
a belt assembly detachably attachable relative to the housing, the belt assembly including
a plurality of rollers, each of which includes a rotary shaft;
a belt entrained around the plurality of rollers and rotated in a certain direction;
a belt first support to support the rotary shaft of each of the plurality of rollers at a first end in a width direction thereof, the belt first support being movable in a direction of twist and fixedly supported by the housing; and
a belt second support fixedly supported by the housing, the belt second support to support the rotary shaft of each of the plurality of rollers at a second end opposite the first end in the width direction, wherein
one of the housing and the belt assembly includes a first hole,
the other of the housing and the belt assembly includes a pin inserted into the first hole, and
the adjuster adjusts a position of the pin relative to the first hole and includes a fastening member to fix a position of the belt first support.

2. The image forming apparatus according to claim 1, wherein the housing comprises
a main-body first support including a first-end main reference and a first-end sub-reference at the first end, and the adjuster, the belt first support being fitted to the first-end main reference and a first-end sub-reference; and
a main-body second support including a second-end main reference and a second-end sub-reference at the second end, the positions of which are fixed, the belt second support being fitted to the second-end main reference and the second-end sub-reference,
wherein one of the first-end main reference and the first-end sub-reference of the main-body first support is fixed, and the position of another of the first-end main reference and the first-end sub-reference is changeable by the adjuster within a plane perpendicular to the width direction.

3. The image forming apparatus according to claim 2, wherein the housing comprises a main frame including a housing main reference and a housing sub-reference, and the main-body first support is a relay member fixed to and held by the housing main reference and the housing sub-reference.

4. The image forming apparatus according to claim 3, wherein the main-body first support is detachably attachable relative to the housing.

5. The image forming apparatus according to claim 1, wherein the belt assembly includes
a detector to detect displacement of the belt in the width direction thereof; and
a correction device to correct displacement of the belt in the width direction by moving one of the plurality of rollers with one end thereof at the first end being fixed and the other end thereof at the second end being moved in forward and backward directions based on a detection result provided by the detector.

6. The image forming apparatus according to claim 5, wherein the belt assembly includes the adjuster to adjust the position of the fixed end of the one of the plurality of rollers.

7. The image forming apparatus according to claim 5, wherein the housing comprises
a main-body first support including a first-end main reference and a first-end sub-reference at the first end, and the adjuster, the belt first support being fitted to the first-end main reference and the first-end sub-reference; and
a main-body second support including a second-end main reference and a second-end sub-reference at the second end, the positions of which are fixed, the belt second support being fitted to the second-end main reference and the second-end sub-reference,
wherein one of the first-end main reference and the first-end sub-reference of the main-body first support, whichever is closer to the rotary shaft, is fixed, and the position of another of the first-end main reference and the first-end sub-reference is changeable by the adjuster within a plane perpendicular to the width direction.

8. The image forming apparatus according to claim 1, wherein the housing comprises
a main-body first support including a first-end main reference and a first-end sub-reference at the first end, the belt first support being fitted to the first-end main reference and the first-end sub-reference;
a main-body second support including a second-end main reference and a second-end sub-reference at the second end, the positions of which are fixed, the belt second support being fitted to the second-end main reference and the second-end sub-reference, and
a main frame including a housing main reference and a housing sub-reference, the main-body first support being fixed to and held by the housing main reference and the housing sub-reference,
wherein one of the housing main reference and the housing sub-reference of the main frame of the housing is fixed, and another of the housing main reference and the housing sub-reference includes the adjuster that changes the position of the another of the housing main reference and the housing sub-reference within a plane perpendicular to the width direction.

9. An image forming apparatus, comprising:
a housing;
an adjuster; and
a belt assembly detachably attachable relative to the housing, the belt assembly including
a plurality of rollers, each of which includes a rotary shaft;
a belt entrained around the plurality of rollers and rotated in a certain direction;
a belt first support to support a first end of the plurality of rollers, the belt first support including a pair of first positioning members;
a belt second support to support a second end of the plurality of rollers opposite the first end, the belt second support including a pair of second positioning members;
the housing including a main-body first support to fixedly support the pair of first positioning members and a main-body second support to fixedly support the pair of second positioning members;
wherein an imaginary plane passes through fixed positions of three positioning members among the pair of first positing members and the pair of second positioning members, the adjuster adjusts a fixed position of a remaining one of the first positioning members and the second positioning members towards and away from the imaginary plane, and the adjuster includes a fastening member to fix the remaining one of the first positioning members and the second positioning members at the fixed position.

10. The image forming apparatus according to claim 9, wherein the adjuster adjusts the fixed position of the remaining one of the first positioning members and the second positioning members towards and away from the imaginary plane while the three positioning members among the pair of first positing members and the pair of second positioning members are fixed.

11. The image forming apparatus according to claim 9, wherein the adjuster adjusts the fixed position of the remaining one of the first positioning members and the second positioning members in a normal direction of the imaginary plane.

12. The image forming apparatus according to claim 1, further comprising:

an image bearing member on which a toner image is formed; and a secondary transfer device to secondarily transfer the toner image, wherein the belt is an intermediate transfer belt onto which the toner image is primarily transferred from the image bearing member, and the toner image on the belt is secondarily transferred onto a recording medium at a position opposite the secondary transfer device.

13. An image forming apparatus, comprising:

a housing, the housing including a first hole;

a belt assembly including a plurality of rollers, each of which includes a rotary shaft; and a belt entrained around the plurality of rollers and rotated in a certain direction;

a pair of first positioning pins including a first pin and a second pin, to position the belt assembly in place relative to the housing at a first end in a width direction of the belt; and an adjuster to adjust a position of the second pin relative to the first pin, wherein the second pin is inserted into the first hole, and the adjuster includes a fastening screw to fix the position of the second pin relative to the first pin.

14. The image forming apparatus according to claim 13, further comprising a pair of second positioning pins to position the belt assembly in place relative to the housing at a second end opposite the first end in the width direction, wherein the adjuster adjusts the position of the second pin relative to the first pin while the position of the pair of second positioning pins is fixed.

15. The image forming apparatus according to claim 13, wherein the adjuster adjusts the position of the second pin in a direction perpendicular to the rotary shafts of the plurality of rollers.

16. The image forming apparatus according to claim 13, wherein the adjuster adjusts the position of the second pin in a direction perpendicular to a straight line connecting the first pin and the second pin.

17. The image forming apparatus according to claim 13, wherein the belt assembly is detachably attachable relative to the housing.

18. The image forming apparatus according to claim 17, wherein the belt assembly is detachable attachable in the width direction of the belt.

19. The image forming apparatus according to claim 13, further comprising a face plate detachably attachable relative to the housing, wherein the belt assembly is positioned in place relative to the housing via the face plate.

20. The image forming apparatus according to claim 19, wherein the adjuster is disposed on the face plate.

21. The image forming apparatus according to claim 1, wherein the fastening member is disposed at a position different from the pin.

22. The image forming apparatus according to claim 9, wherein the fastening member is disposed at a position different from the remaining one of the first positioning members and the second positioning members.

23. The image forming apparatus according to claim 13, wherein the fastening screw is disposed at a position different from the second pin.

* * * * *